Figure 1:
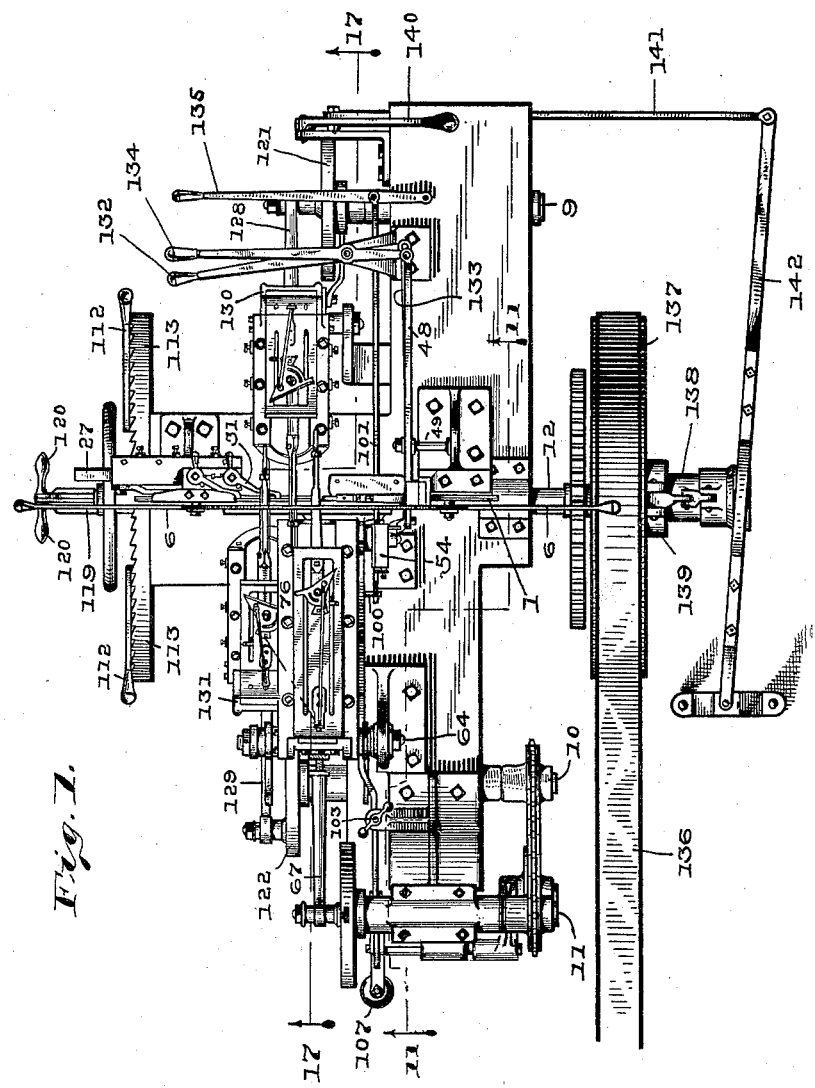

No. 610,980. Patented Sept. 20, 1898.
T. L. WALLACE & J. A. REED.
SAW FILING MACHINE.
(Application filed Feb. 7, 1898.)

(No Model.) 20 Sheets—Sheet 1.

WITNESSES:

F. W. Woerner
J. A. Walsh

INVENTORS
Thomas L. Wallace
and James A. Reed,
BY
Chester Bradford,
ATTORNEY.

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 2.

WITNESSES:
F. W. Woerner
J. A. Walsh

INVENTORS
Thomas L. Wallace
AND James A. Reed,
BY Chester Bradford,
ATTORNEY.

No. 610,980. Patented Sept. 20, 1898.
T. L. WALLACE & J. A. REED.
SAW FILING MACHINE.
(Application filed Feb. 7, 1898.)

(No Model.) 20 Sheets—Sheet 3.

WITNESSES:
F. W. Woerner
J. A. Walsh

INVENTORS
Thomas L. Wallace
AND James A. Reed,
BY
Chester Bradford,
ATTORNEY.

THE NORRIS PETERS CO., PHOTO-LITHO., WASHINGTON, D. C.

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 4.

WITNESSES:
F. W. Woerner
J. A. Walsh

INVENTORS
Thomas L. Wallace
and James A. Reed,
BY
Chester Bradford,
ATTORNEY.

No. 610,980. Patented Sept. 20, 1898.
T. L. WALLACE & J. A. REED.
SAW FILING MACHINE.
(Application filed Feb. 7, 1898.)

(No Model.) 20 Sheets—Sheet 6.

WITNESSES:
F. W. Woerner
J. A. Walsh

INVENTORS
Thomas L. Wallace
AND James A. Reed,
BY
Chester Bradford,
ATTORNEY.

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 7.
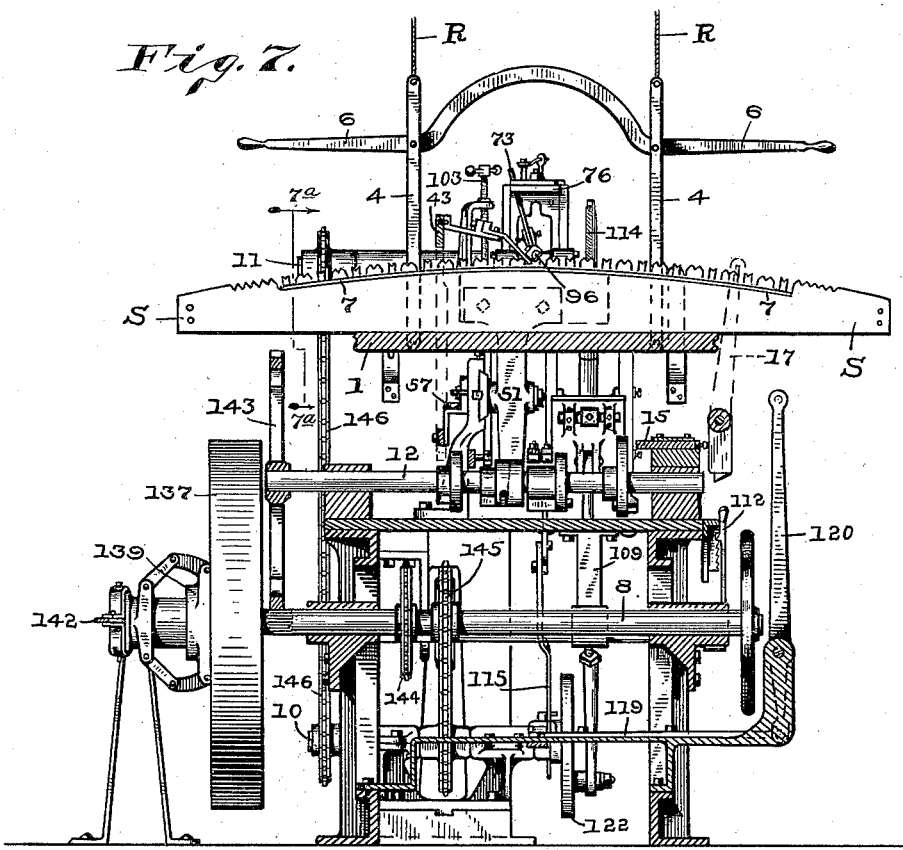
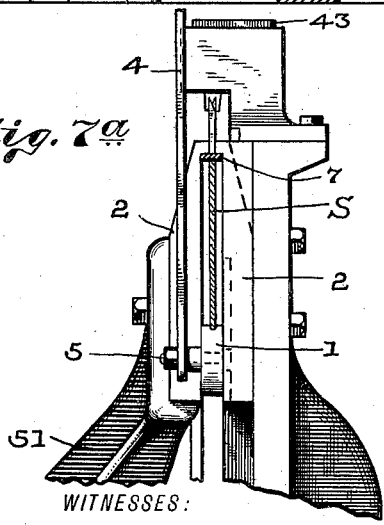
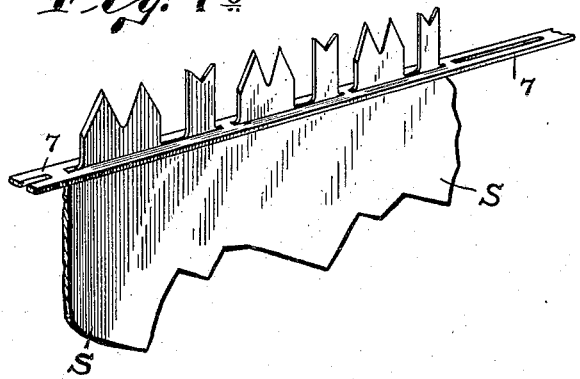
WITNESSES:
F. W. Worner
J. A. Walsh
INVENTORS
Thomas L. Wallace,
James A. Reed,
BY
Chester Bradford,
ATTORNEY.

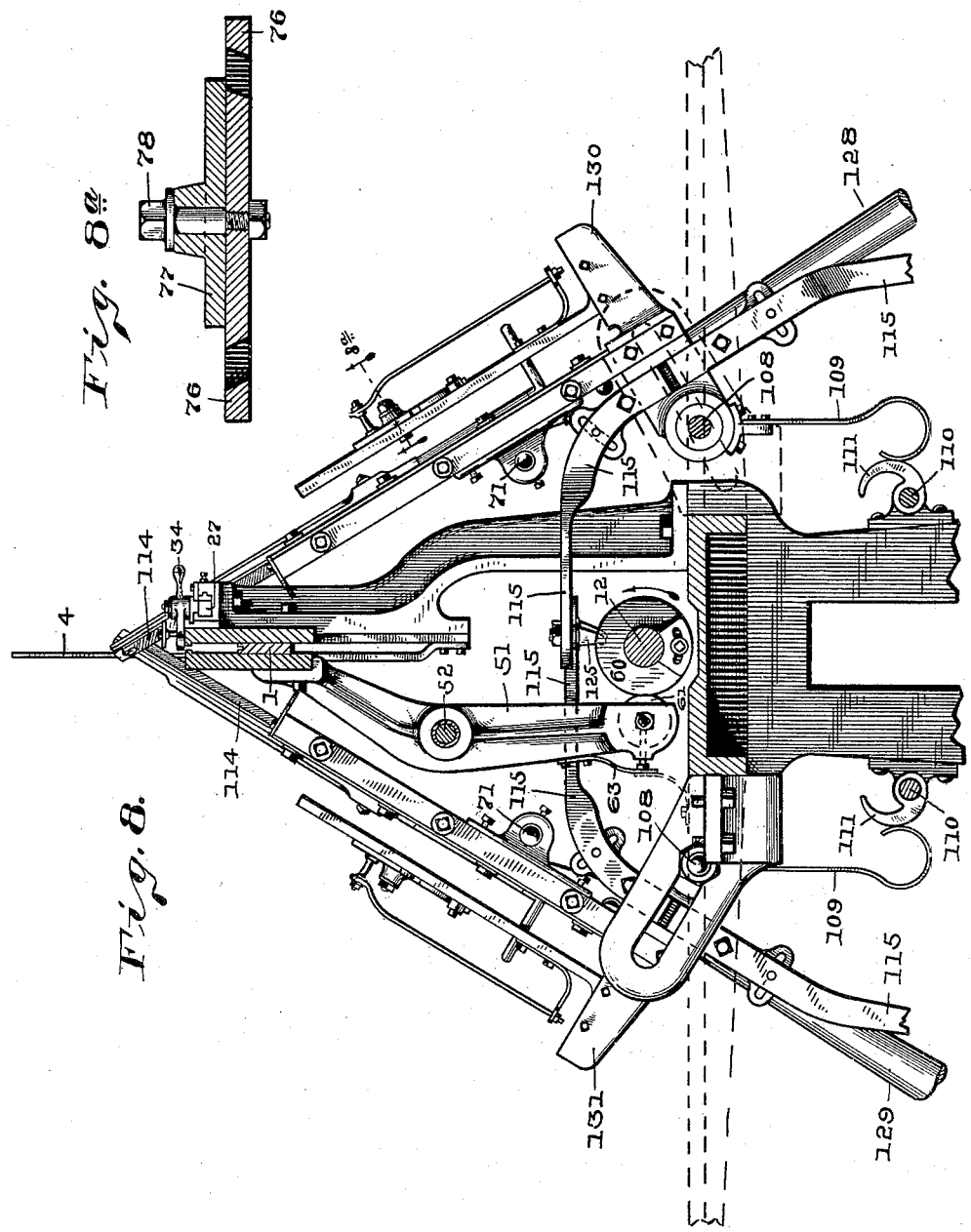

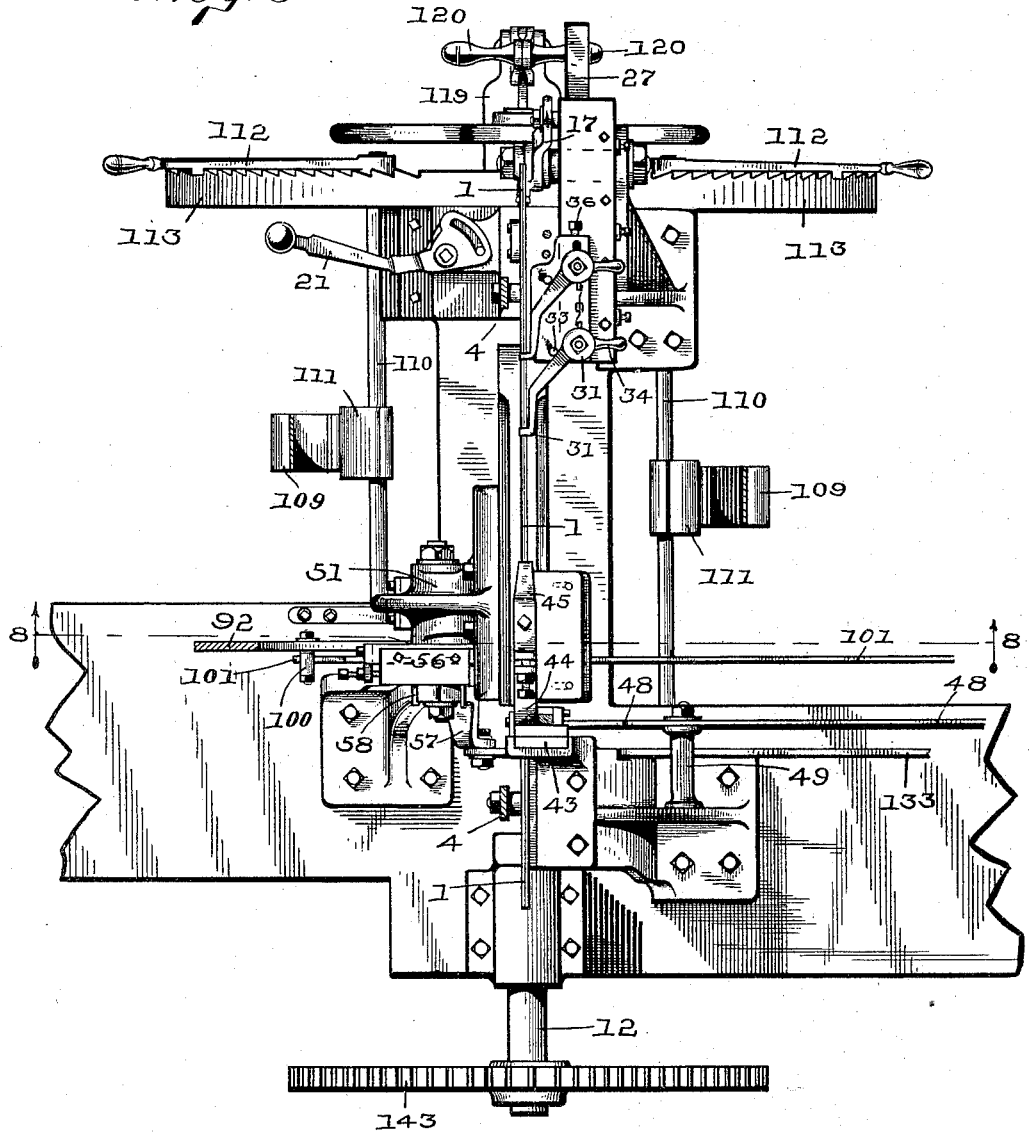

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 10.

WITNESSES:

INVENTORS
Thomas L. Wallace,
and James A. Reed,
BY
Chester Bradford,
ATTORNEY.

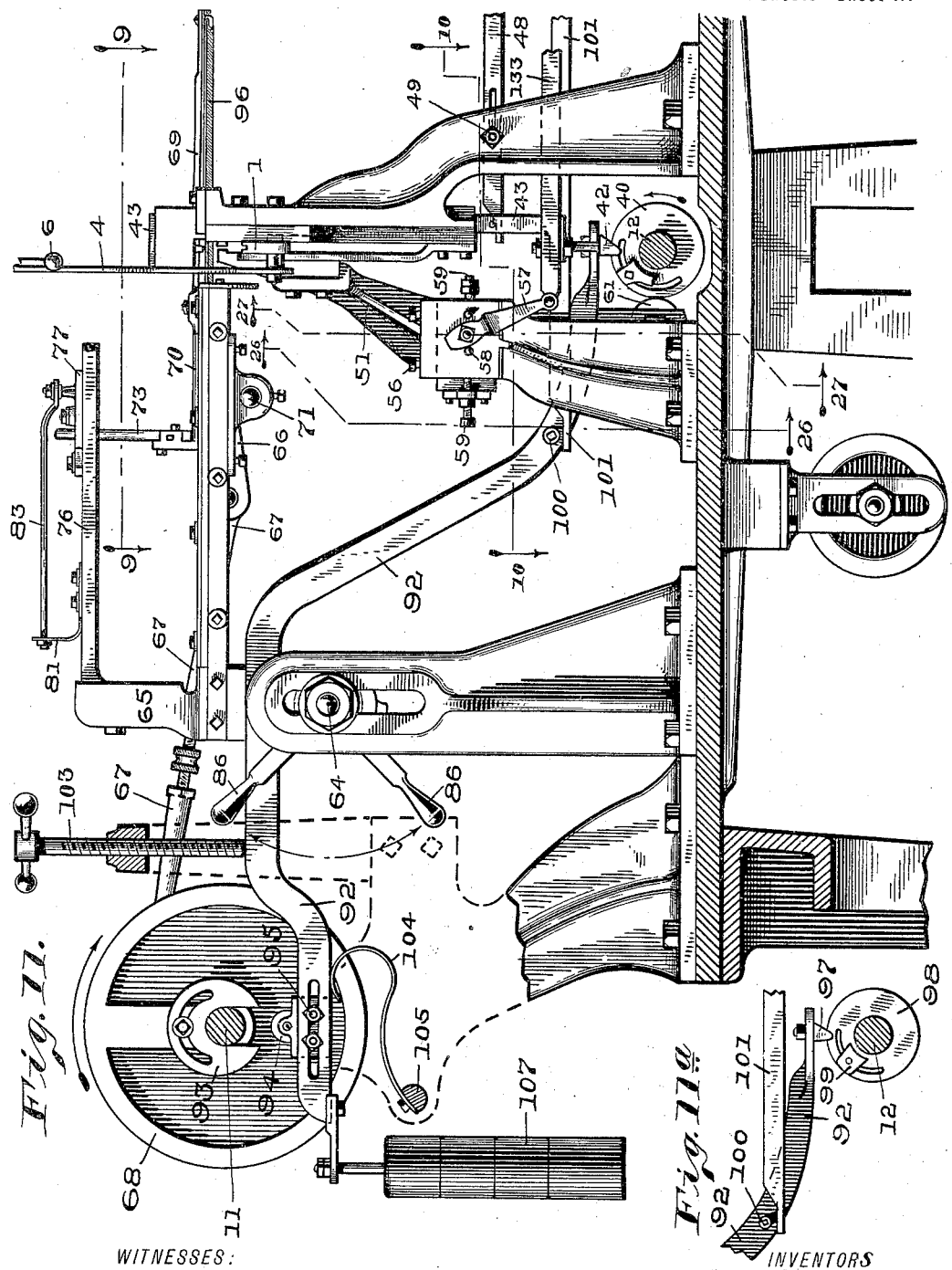

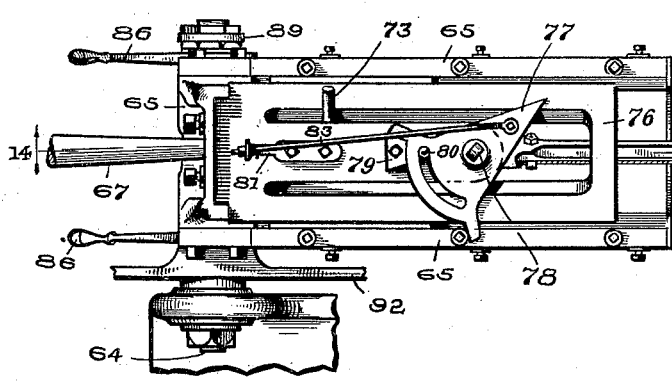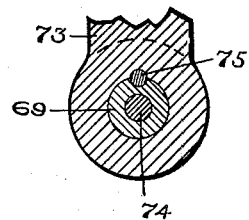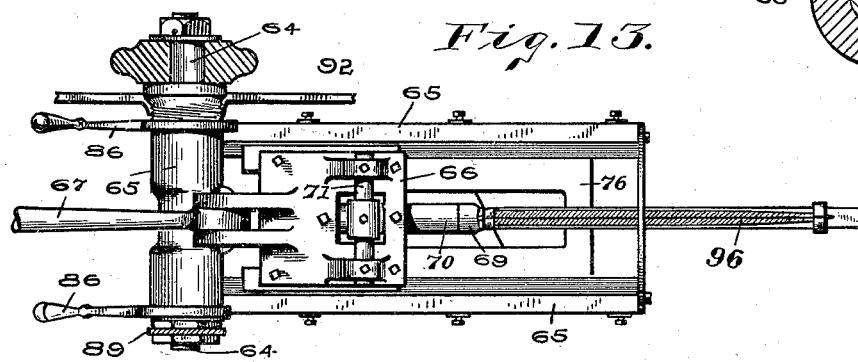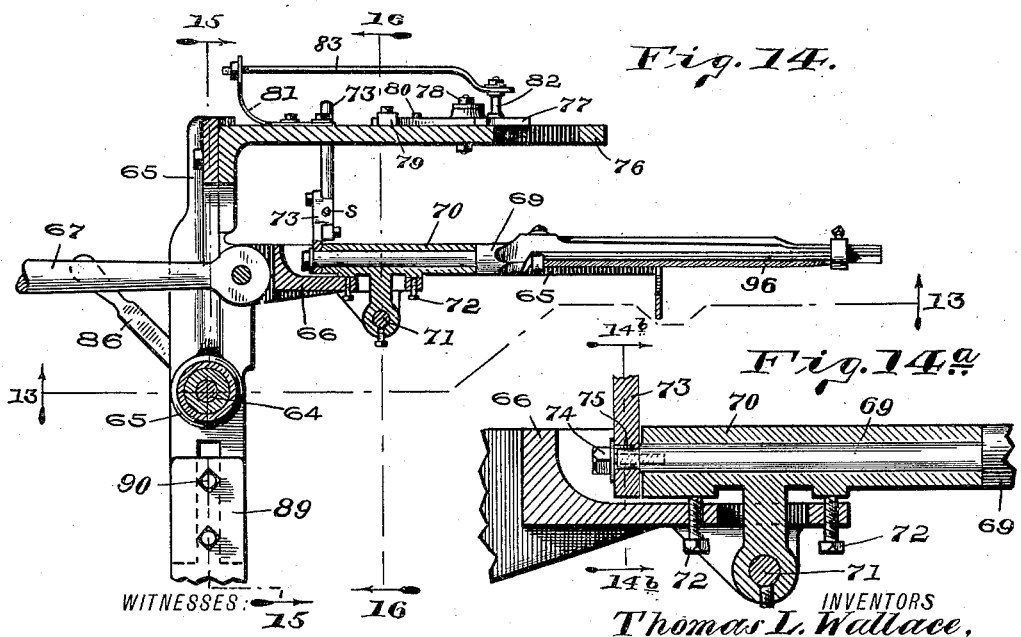

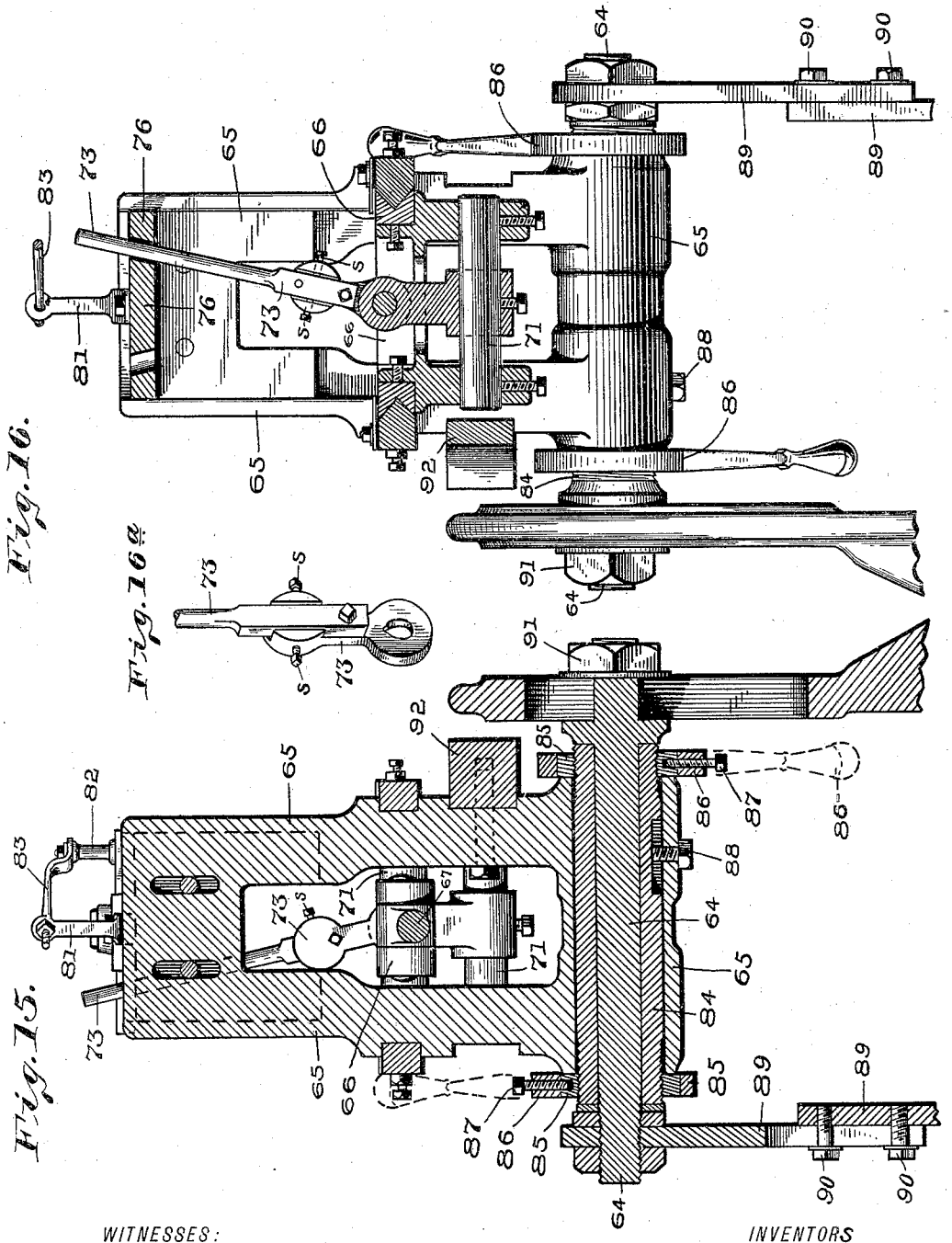

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 14.
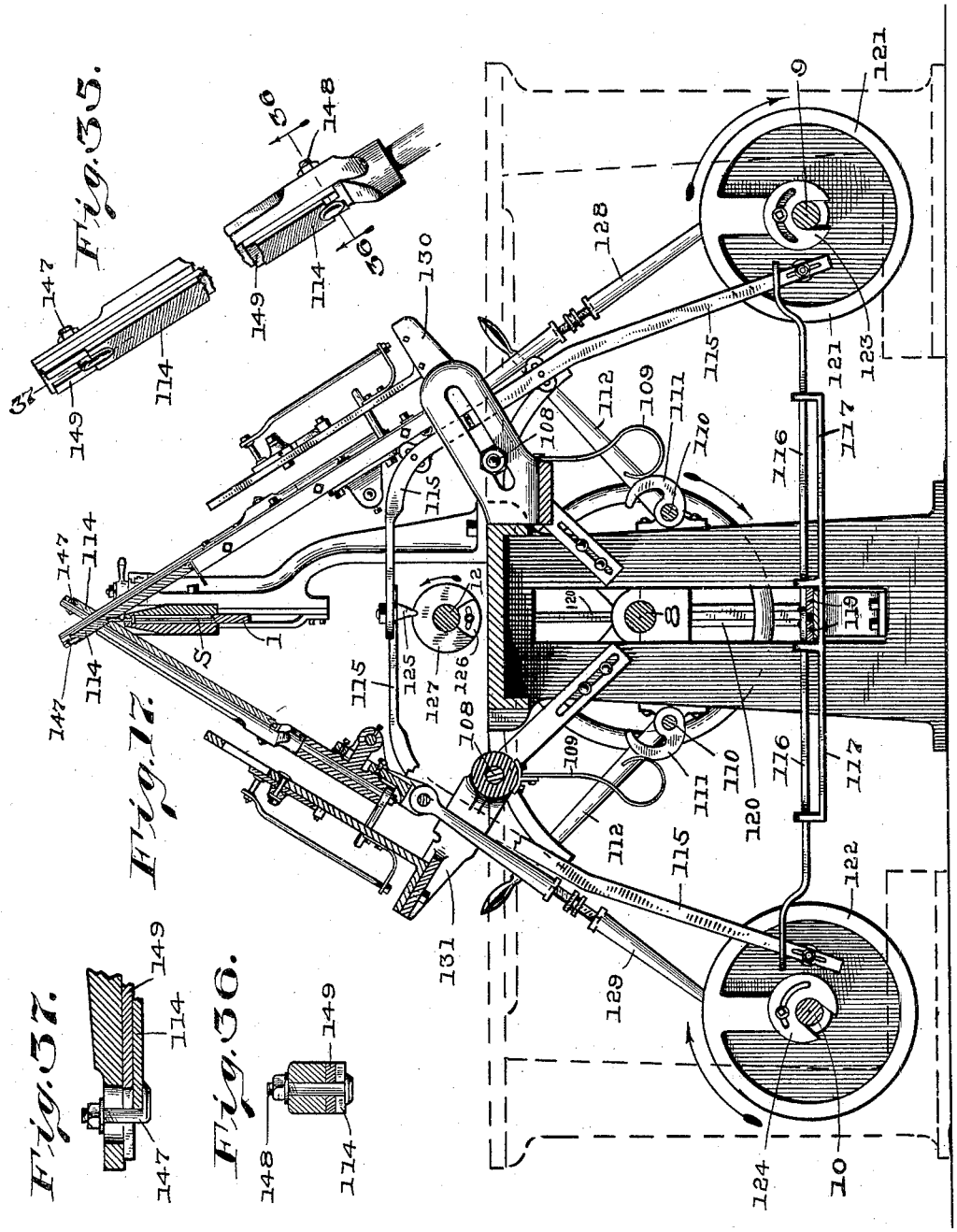
WITNESSES:
F. W. Woerner.
J. A. Walsh.
INVENTORS
Thomas L. Wallace,
and James A. Reed,
BY
Chester Bradford,
ATTORNEY.

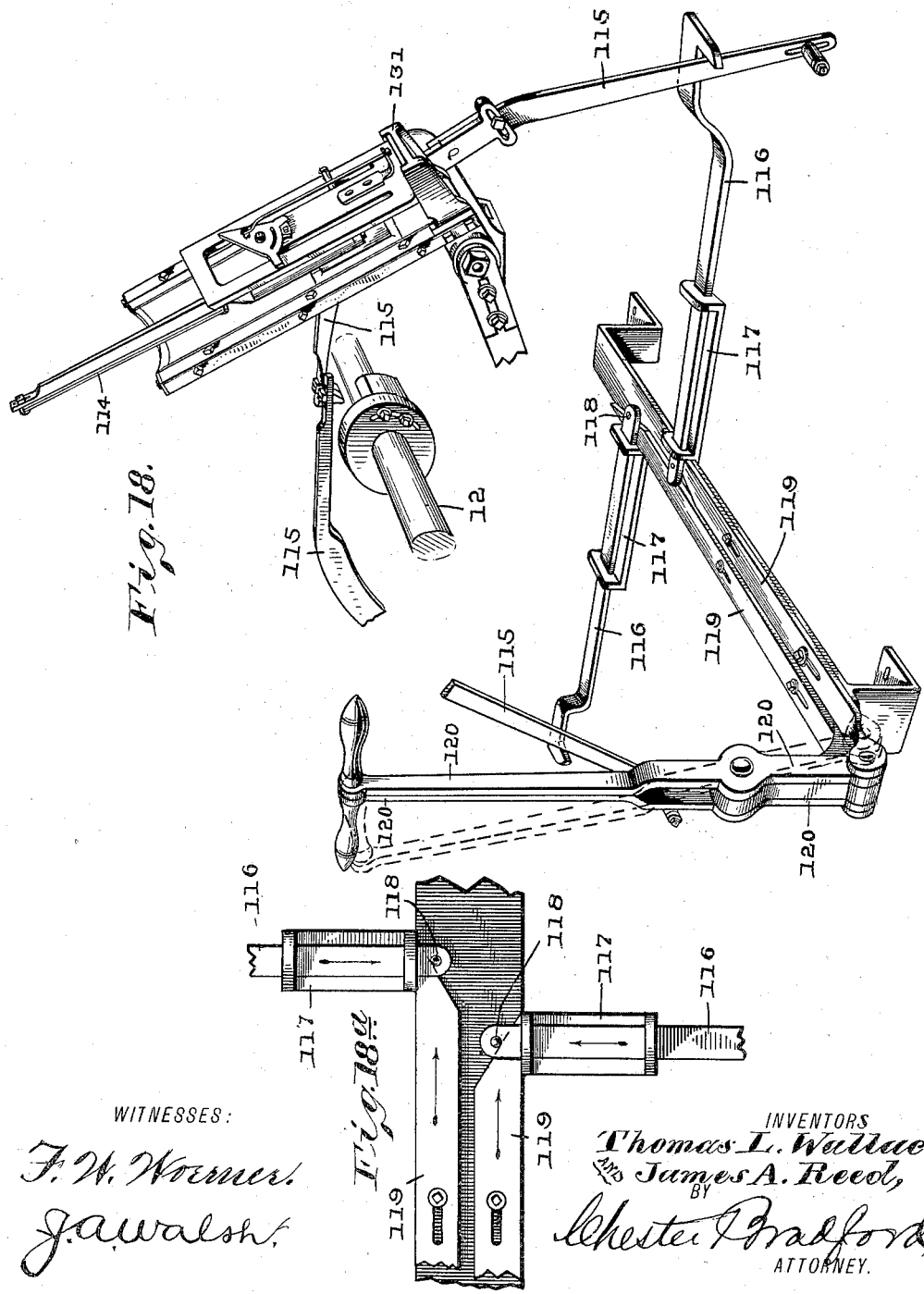

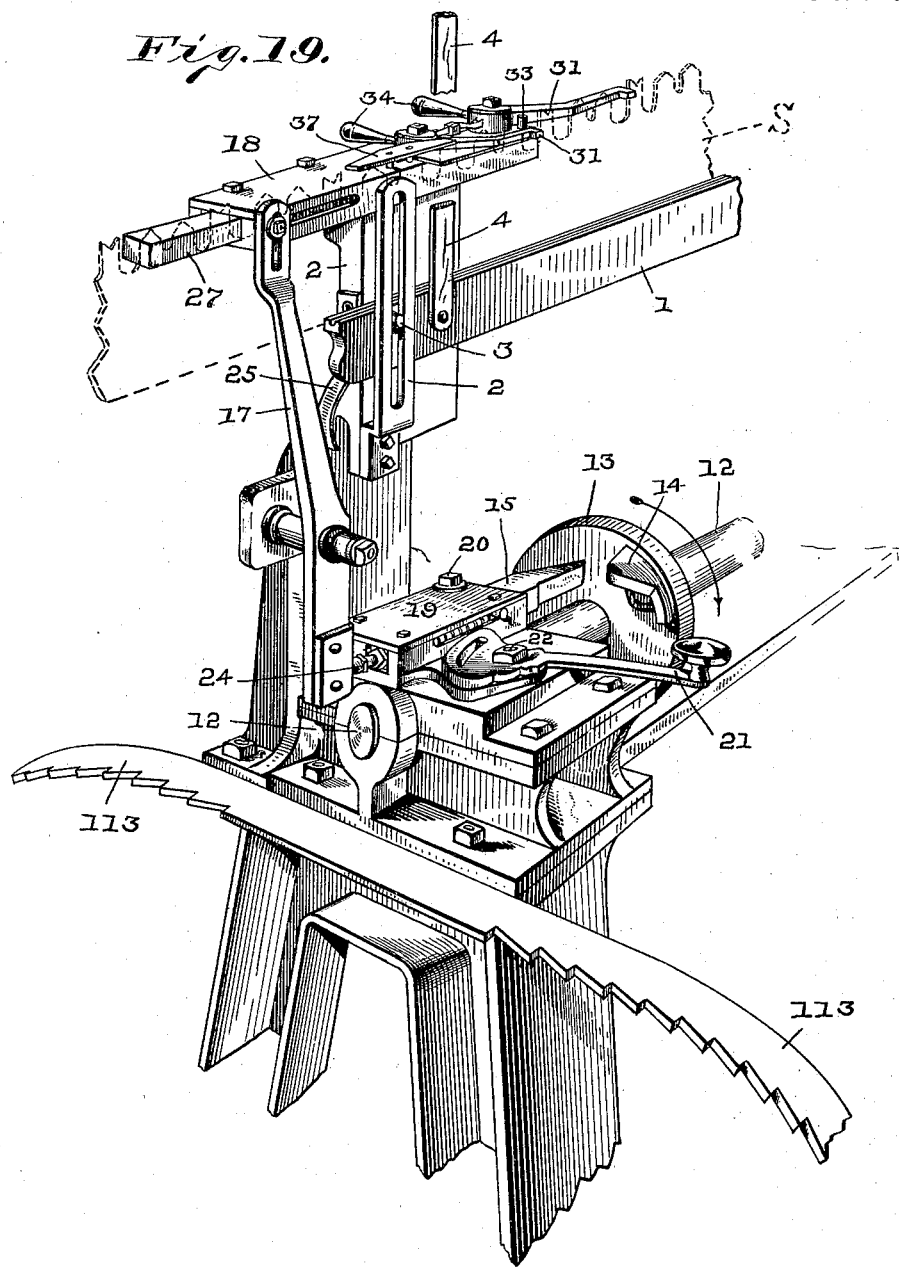

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 17.
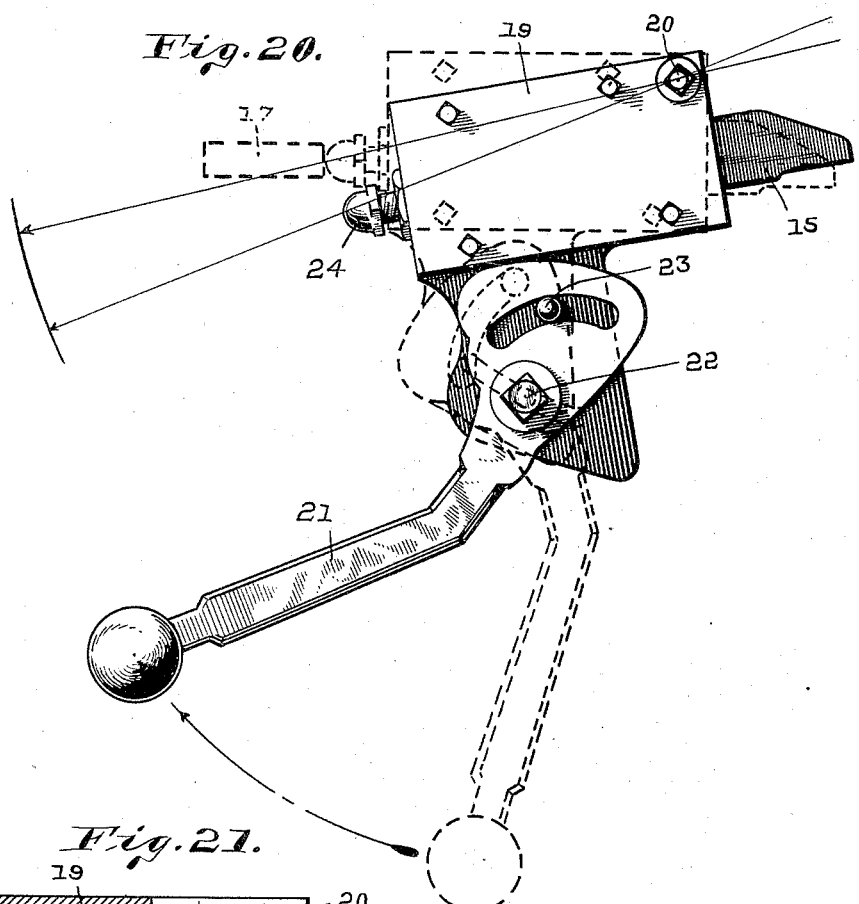
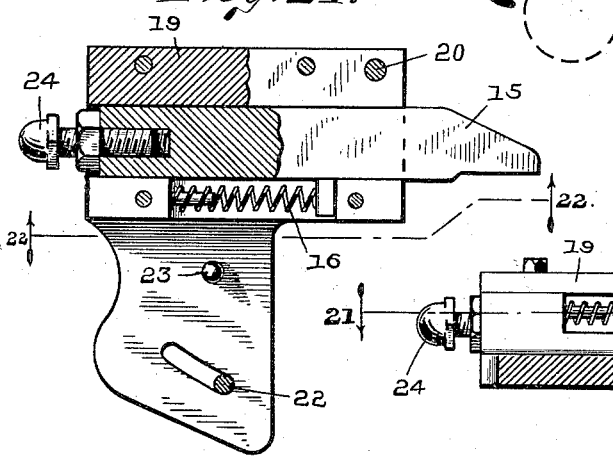
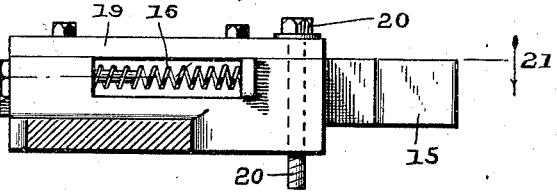
WITNESSES:
F. W. Woerner.
J. A. Walsh.
INVENTORS
Thomas L. Wallace,
AND James A. Reed,
BY Chester Bradford,
ATTORNEY.

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 18.
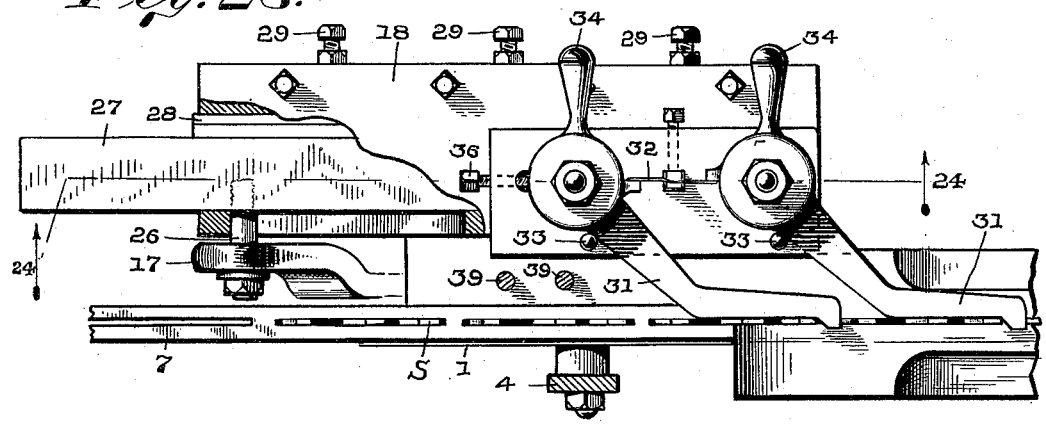
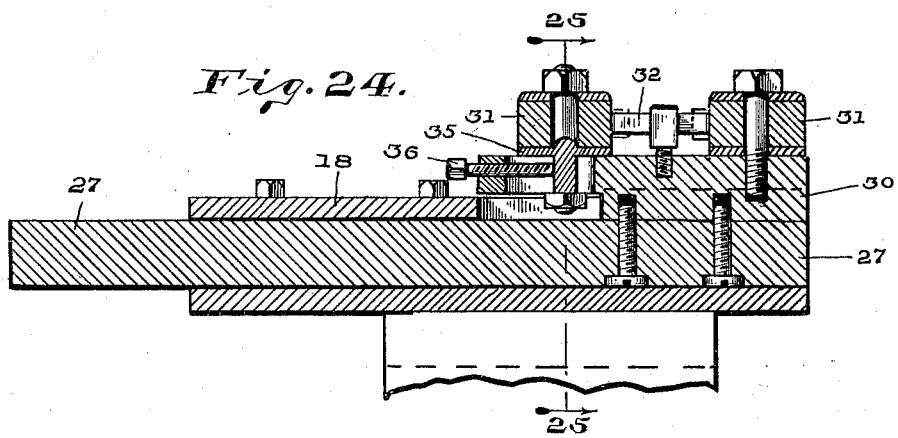
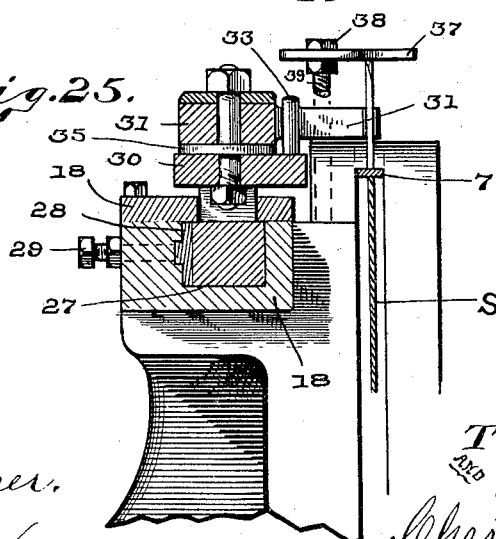
WITNESSES:
F. W. Horner.
J. A. Walsh.
INVENTORS:
Thomas L. Wallace,
James A. Reed,
BY
Chester Bradford,
ATTORNEY.

No. 610,980. Patented Sept. 20, 1898.
T. L. WALLACE & J. A. REED.
SAW FILING MACHINE.
(Application filed Feb. 7, 1898.)
(No Model.) 20 Sheets—Sheet 19.

WITNESSES:
F. W. Werner.
J. A. Walsh.

INVENTORS
Thomas L. Wallace,
& James A. Reed,
BY
Chester Bradford,
ATTORNEY.

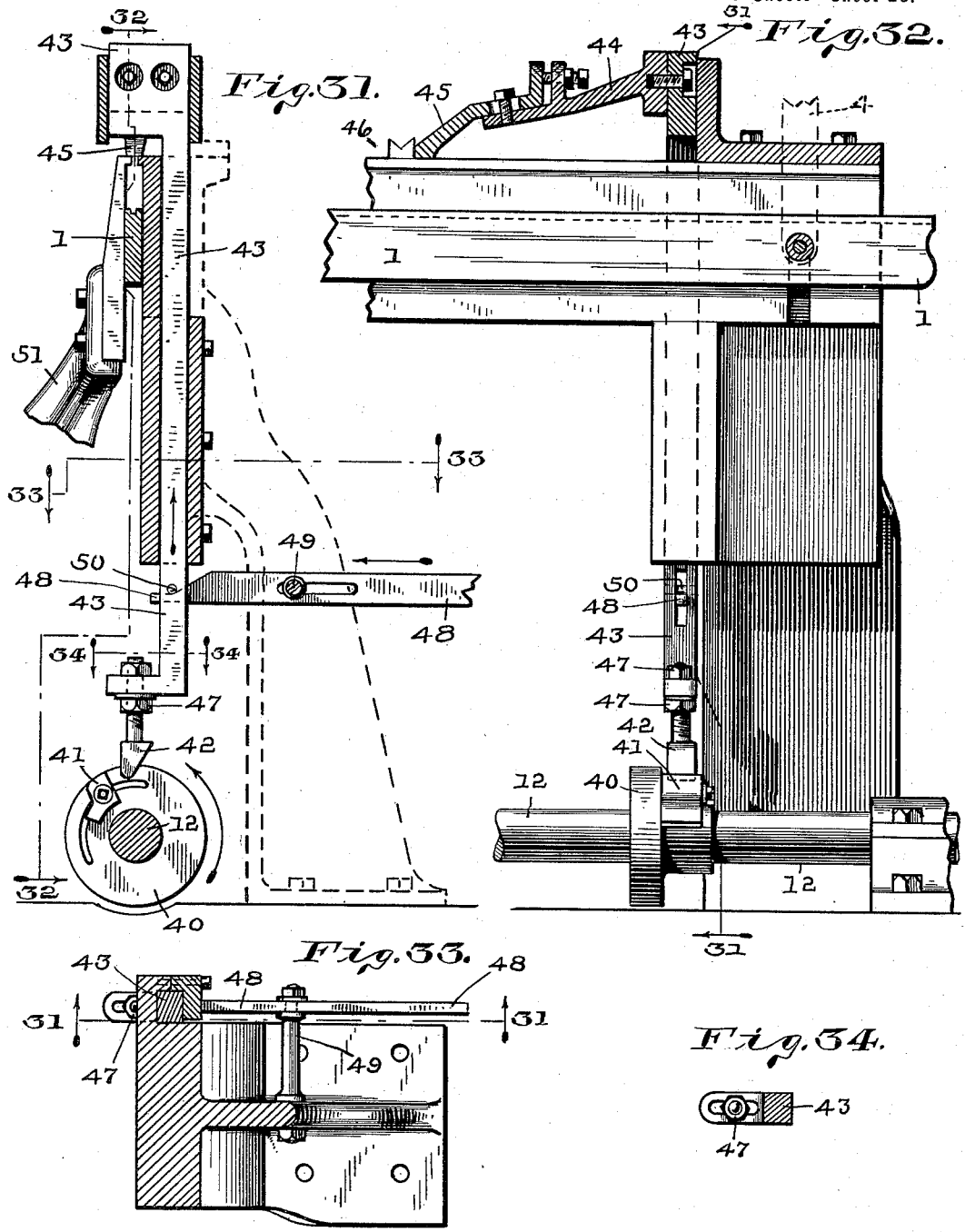

UNITED STATES PATENT OFFICE.

THOMAS L. WALLACE AND JAMES A. REED, OF INDIANAPOLIS, INDIANA, ASSIGNORS TO THE E. C. ATKINS & COMPANY, OF SAME PLACE.

SAW-FILING MACHINE.

SPECIFICATION forming part of Letters Patent No. 610,980, dated September 20, 1898.

Application filed February 7, 1898. Serial No. 669,329. (No model.)

*To all whom it may concern:*

Be it known that we, THOMAS L. WALLACE and JAMES A. REED, citizens of the United States, residing at Indianapolis, in the county of Marion and State of Indiana, have invented certain new and useful Improvements in Saw-Filing Machines, of which the following is a specification.

The object of our present invention is to produce a saw-filing machine capable of filing saws of that class known as "crosscut-saws."

The nature of said invention, as well as the construction of a machine embodying the same, will be stated in the following description and illustrated in the accompanying drawings, in which—

Figure 2:
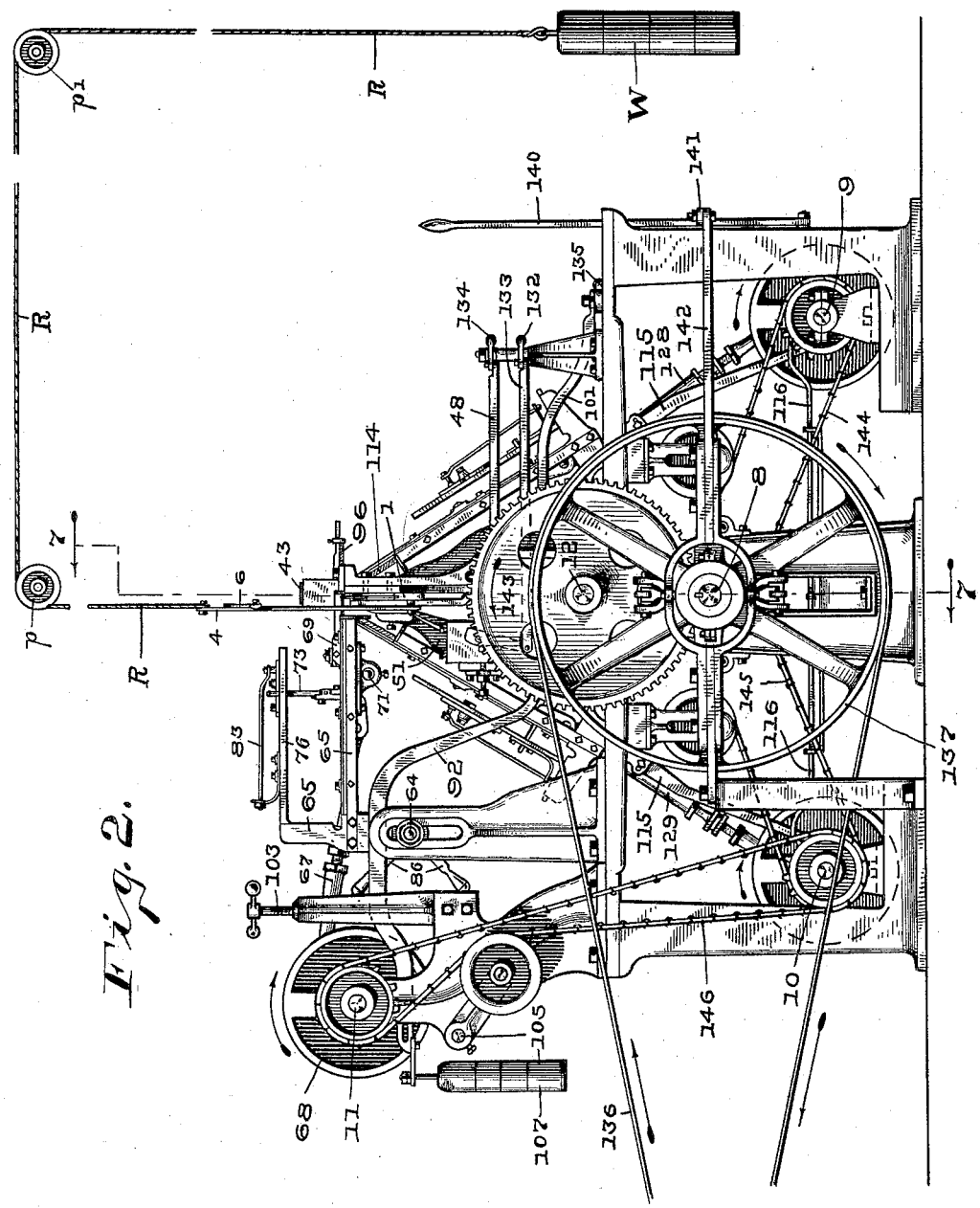
Figure 3:
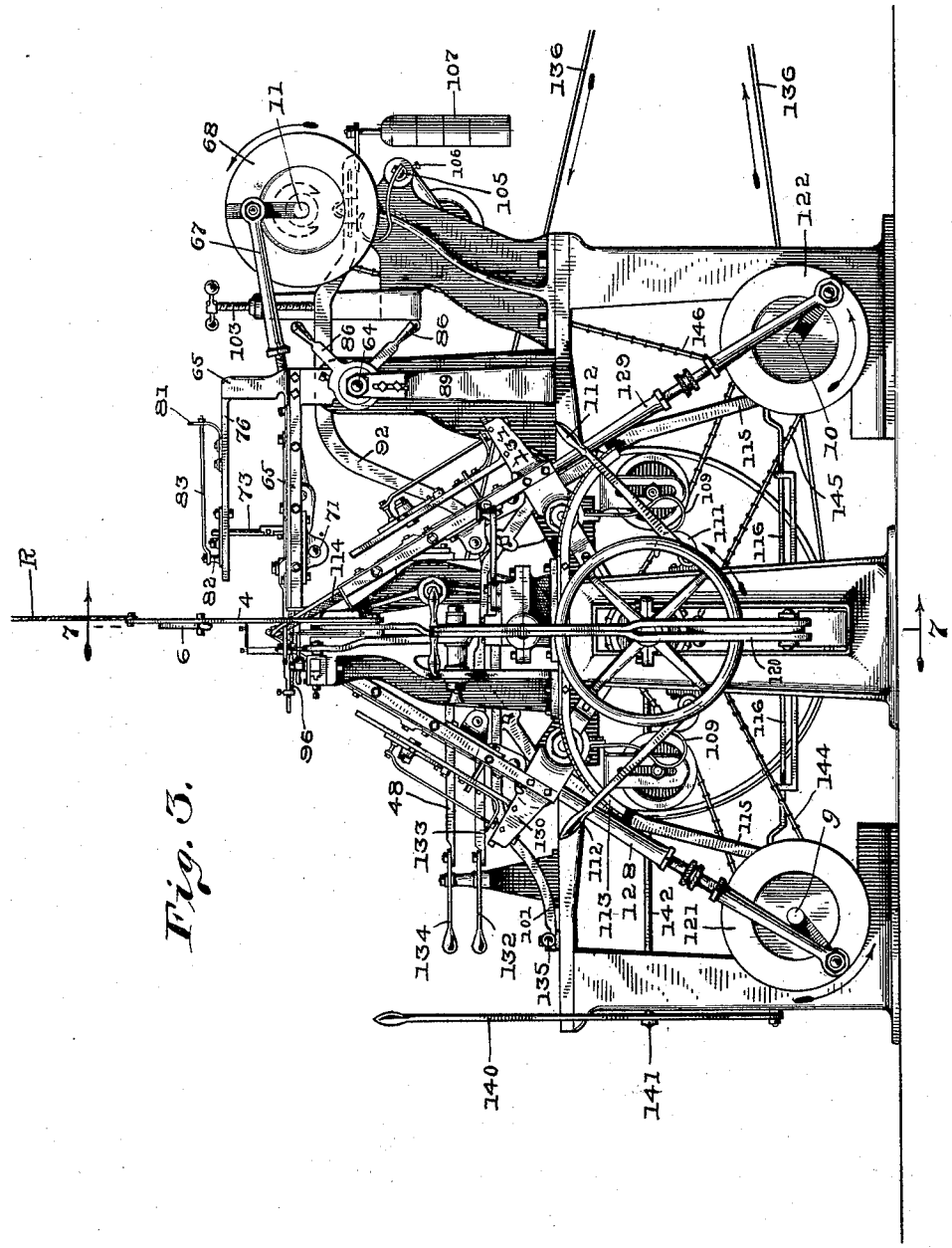
Figure 4:
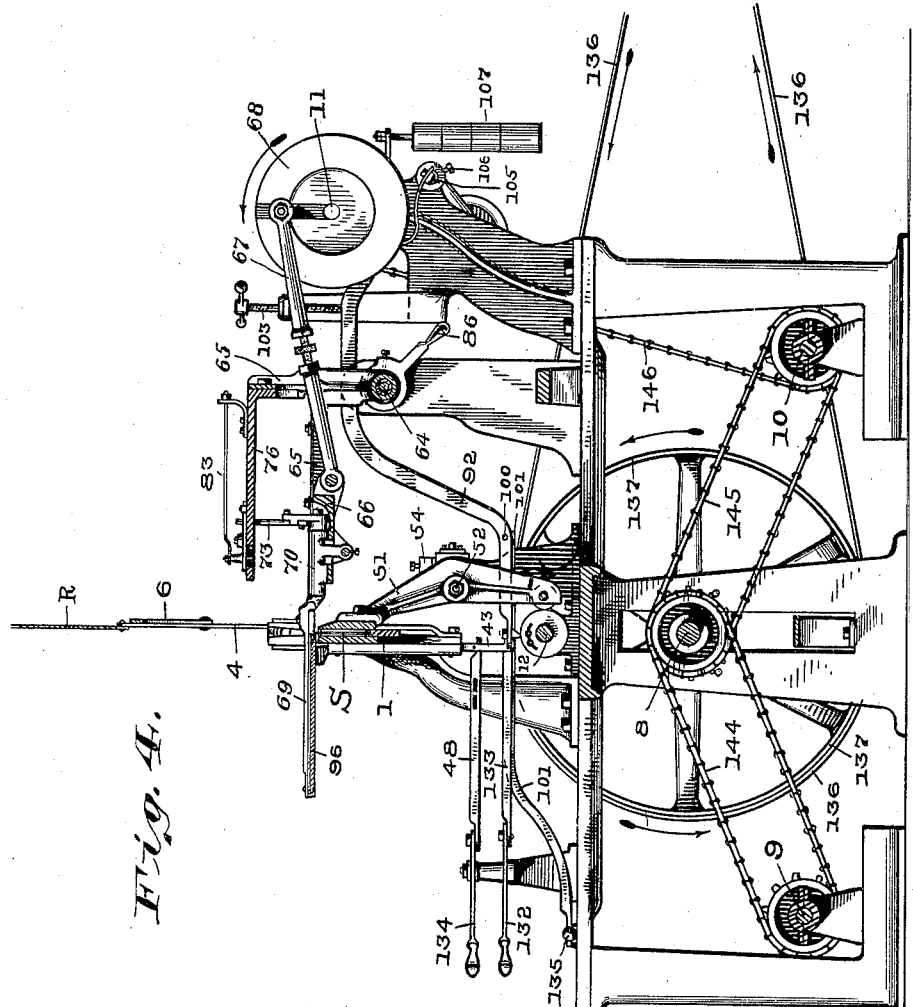
Figure 5:
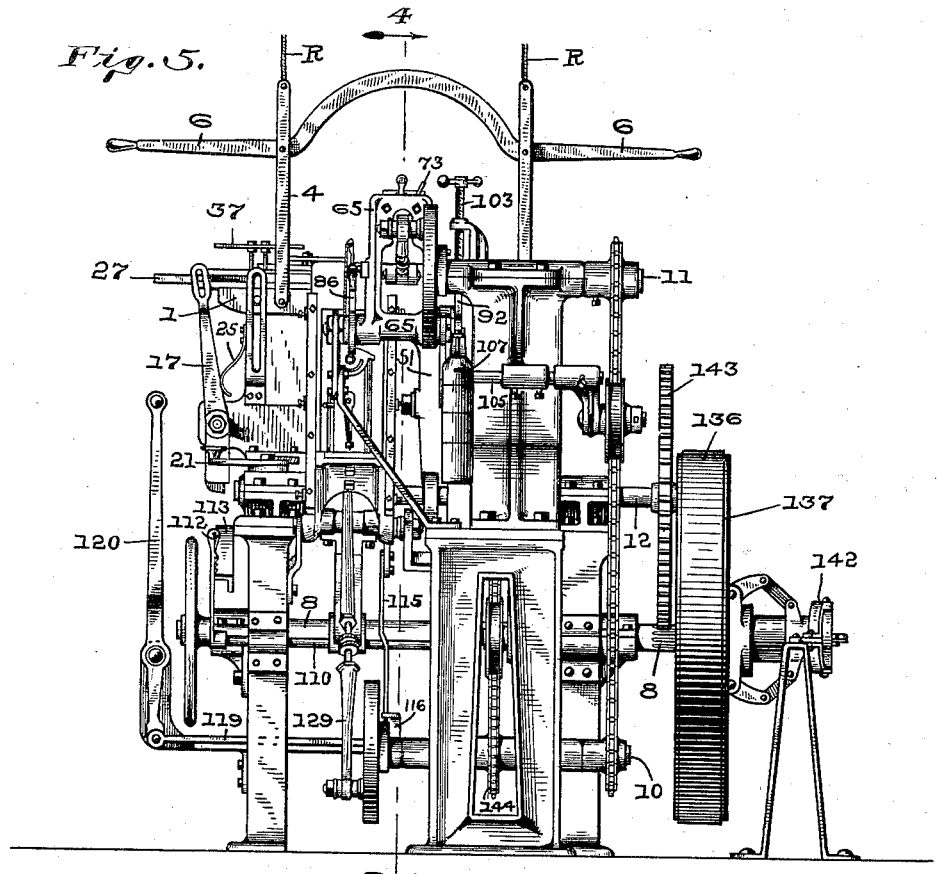
Figure 6:
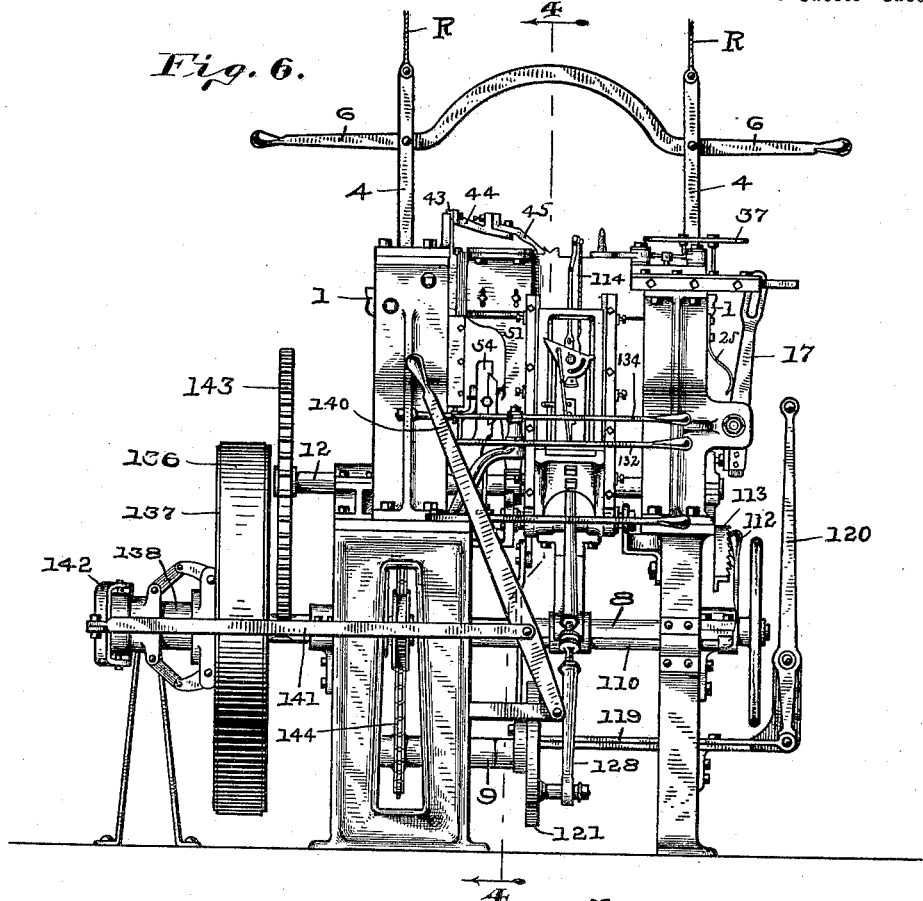
Figure 6A:
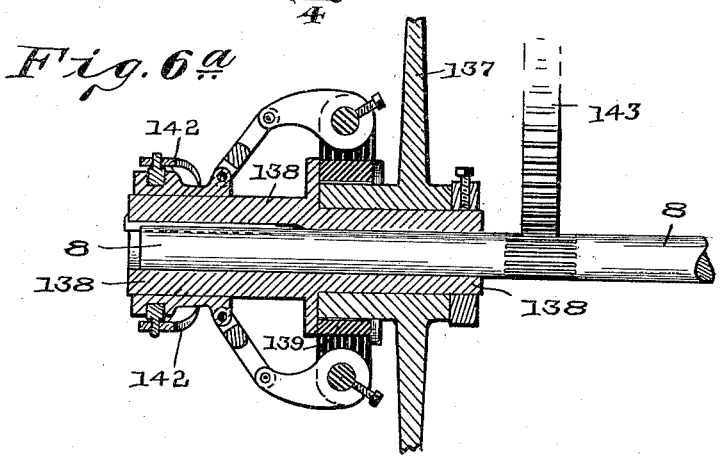
Figure 10:
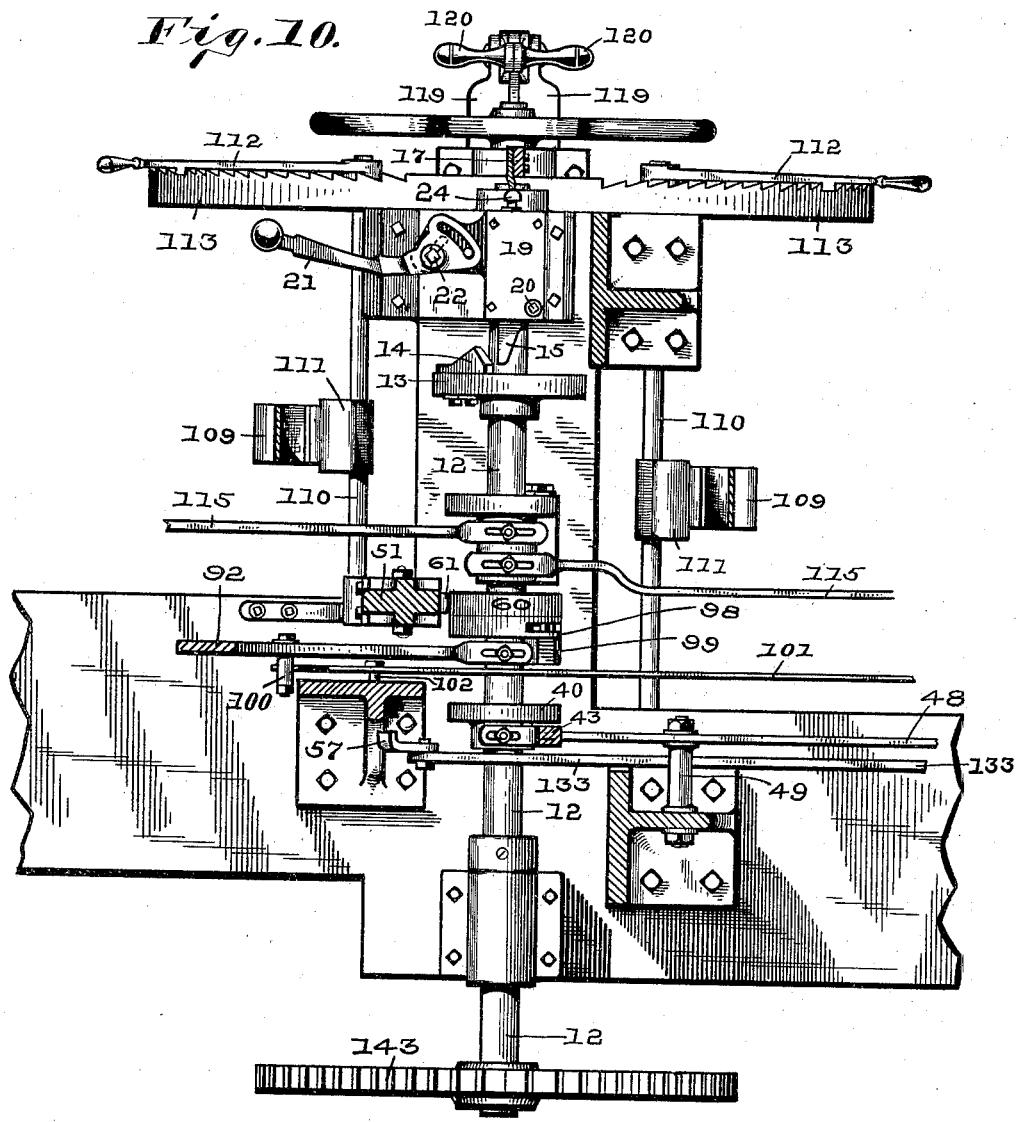
Figure 26:
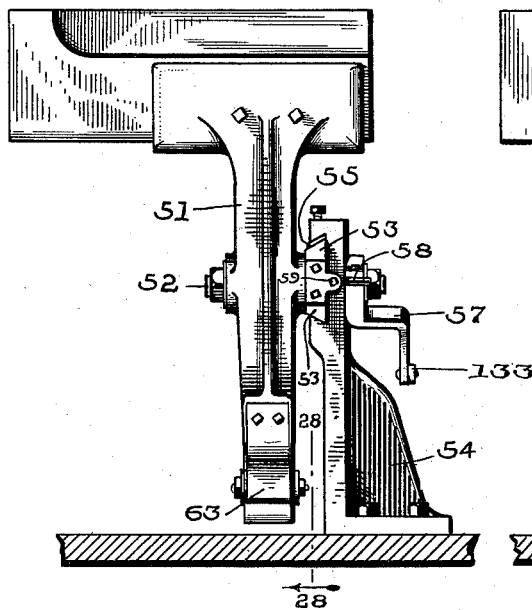
Figure 27:
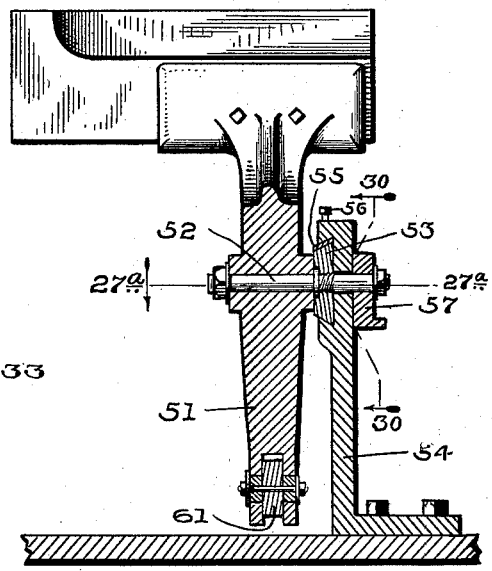
Figure 28:
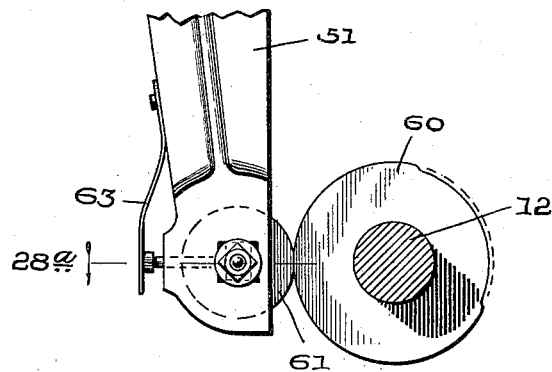
Figure 30:
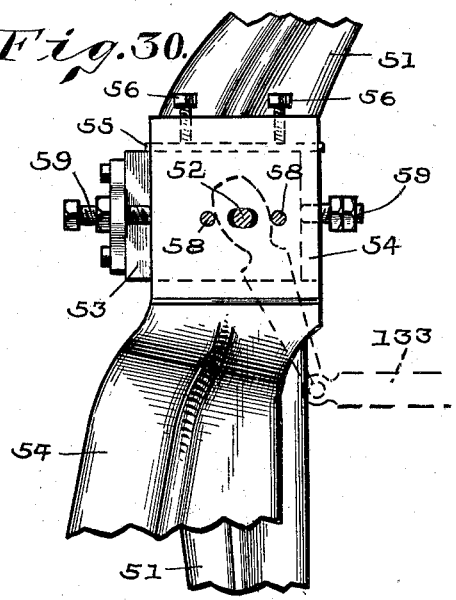
Figure 29:
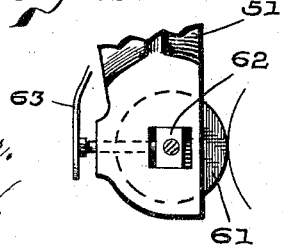

Figure 1 is a top or plan view, on a small scale, of a complete machine embodying our said invention. Fig. 2 is an elevation of one side of such a machine. Fig. 3 is an elevation of the other side of said machine; Fig. 4, a longitudinal vertical section of said machine as seen from the dotted line 4 4 in Figs. 5 and 6. Fig. 5 is an elevation of one end of said machine. Fig. 6 is an elevation of the other end of said machine. Fig. 6$^a$ is a sectional view through the sleeve-shaft, showing the clutch mechanism by which the machine is thrown into and out of operation. Fig. 7 is a transverse central sectional view of said machine as seen from the dotted line 7 7 in Figs. 2 and 3. Fig. 7$^a$ is a detail view, on a considerably-enlarged scale, as seen from the dotted line 7$^a$ 7$^a$ in Fig. 7. Fig. 7$^b$ is a fragmentary perspective view showing a portion of the edge of a saw and the guide-strip thereon. Fig. 8 is a transverse sectional view of a portion of the machine, on an enlarged scale, as seen from the dotted line 8 8 in Fig. 9. Fig. 8$^a$ is a detail sectional view on the dotted line 8$^a$ in Fig. 8. Fig. 9 is a top or plan view of the central portion of the machine with the file-carriages removed as seen from the dotted line 9 9 in Fig. 11. Fig. 10 is a horizontal sectional plan view as seen from the dotted line 10 10 in Fig. 11. Fig. 11 is a detail transverse sectional view of a portion of the machine, illustrating especially the mechanism which operates the file for the clearing-teeth of the saw, as seen from the dotted line 11 11 in Fig. 1. Fig. 11$^a$ is a detail elevation of the cam-operating bar 92, &c. Fig. 12 is a top or plan view of one of the file-carriages and file-shifters. Fig. 13 is an under side plan view of the same. Fig. 14 is a central sectional view thereof on the dotted line 14 14 in Fig. 12. Fig. 14$^a$ is a detail view, on a still further enlarged scale, similar to a portion of Fig. 14. Fig. 14$^b$ is a detail transverse sectional view, on a still further enlarged scale, on the dotted line 14$^b$ 14$^b$ in Fig. 14$^a$. Fig. 15 is a transverse sectional view on the dotted line 15 15 in Fig. 14, but on a larger scale. Fig. 16 is a detail sectional view as seen from the dotted line 16 16 in Fig. 14. Fig. 17 is a longitudinal vertical sectional view as seen from the dotted line 17 17 in Fig. 1. Fig. 18 is a skeleton perspective view illustrating certain of the cams whereby various of the movements are controlled, as will be hereinafter explained. Fig. 18$^a$ is a detail plan view showing some of the cams on a larger scale. Fig. 19 is a skeleton perspective view illustrating the feeding apparatus and adjacent parts. Fig. 20 is a detail plan view illustrating a means of throwing the feed works into and out of operative position and showing the two positions by means of dotted lines. Fig. 21 is a detail plan view as seen from the dotted line 21 21 in Fig. 22. Fig. 22 is a detail view as seen from the dotted line 22 22 in Fig. 21. Fig. 23 is a detail view of the feeding device on an enlarged scale. Fig. 24 is a detail sectional view as seen from the dotted line 24 24 in Fig. 23. Fig. 25 is a detail transverse sectional view as seen from the dotted line 25 25 in Fig. 24. Fig. 26 is a detail elevation of the vise or clamp which clamps the saw-blade while it is being filed. Fig. 27 is a similar view showing the shank of said vise, and also the standard by which it is carried, in section. Fig. 27$^a$, Sheet 5, is a horizontal sectional view as seen when looking downwardly from the dotted line 27$^a$ 27$^a$ in Fig. 27, Sheet 19. Fig. 28 is a detail elevation of the lower end of the vise-shank and the adjacent cam. Fig. 28$^a$, Sheet 5, is a horizontal sectional view seen from the dotted line 28$^a$ in Fig. 28, Sheet 19. Fig. 29 is a view similar to a portion of Fig. 28, but with the washer and nut removed, showing the yielding bearing for the antifriction-roller therein more clearly. Fig. 30 is a detail view illustrating how the moving member of the saw-vise is thrown into and out of operative position, as seen from the dotted line 30 30 in Fig. 27. Fig. 31 is a view, on an enlarged scale, of the stop mechanism by which the saw is stopped at exactly the right position to be filed, as seen from the dotted line 31 31 in Fig. 32. Fig. 32 is a view of the same as seen from the dotted line 32 32 in Fig. 31. Fig. 33 is a horizontal sectional view looking downwardly from the dotted line 33 33 in Fig. 31. Fig. 34 is a small detail sectional view as seen from the dotted line 34 34 in Fig. 31. Fig. 35, Sheet 14, is a fragmentary perspective view of the two ends of a file-holder which carries one of the files which operates upon the cutting-teeth of the saw. Fig. 36 is a transverse sectional view of the file-holder and file on the dotted line 36 36 in Fig. 35. Fig. 37 is a detail longitudinal sectional view of the upper end of the file-holder illustrated in Fig. 35.

As heretofore stated, this machine is designed especially for filing crosscut-saws. In Fig. 7 such a saw S is shown, and it is supported upon a carrier 1, which is positioned between guides 2, which form a portion of or are rigid with the frame, and said carrier is thereby kept from lateral movement, although free to move vertically. As shown in Fig. 19, longitudinal movement is prevented by studs 3, which extend out through suitable slots in the guide-pieces 2. The carrier 1, as well as the saw which rests thereon, is held upwardly by ropes R, running over pulleys $p'$ $p'$, positioned above the machine, and which carry on their other ends weights W, these latter being shown only in Fig. 2. The ends of the ropes R are preferably not immediately connected to the carrier 1, but instead bars 4 are interposed, which are directly connected to the carrier by means of pivots 5, and at a point near the upper ends of these bars 4 they are pivoted again to a bar 6, which is substantially parallel with the carrier 1. Each end of the carrier is thus supported independently of the other by its own rope and weight, and it is thus constantly held up against the saw and the saw itself held to the desired position. The ends of the bar 6 extend out into handles by which the operator may force either or both ends of the carrier down at will.

As clearly shown in Fig. 7ª, the guides 2 at their upper ends overhang somewhat, and the under sides of these overhanging portions form shoulders. In fitting the saw to be placed into the machine we place over the teeth thereof a narrow slitted flexible strip 7, the slits being sufficient to receive the teeth and having transverse solid portions between the slits which when the strip is placed on a saw fit down into the spaces between the teeth next their roots. This strip 7 in operation rests up against the shoulders in the guides above spoken of, and the saw is thus prevented from being raised farther than is designed, the shoulders being predeterminedly so positioned that the points of the teeth come to exactly the location desired for filing.

Crosscut-saws, as is well known and as shown in the drawings, particularly Fig. 7, vary considerably in width, and the breasts or cutting edges are usually curved. It would therefore be impossible to pass such a saw over a carrier having a fixed or unvarying position without also providing for a constant variation in the position of the filing mechanism, which, if not altogether impracticable, is obviously very difficult of accomplishment. By means of our invention just described the breast or rounding portion of the saw is made to control the position of said saw as it passes through the machine, and thus the disadvantages referred to are completely obviated. We regard this, therefore, as a leading and highly important feature of our invention.

There are five principal shafts in our machine—viz., a main shaft 8, three file-propelling shafts 9, 10, and 11, and what will herein be designated a "cam-shaft" 12—the relative positions of which shafts are perhaps best shown in Fig. 4. The shafts 8, 9, 10, and 11 are designed to run at equal speeds. The cam-shaft 12 is designed to run at a much lower speed than the others, and we have found by experiment that a speed of one-eleventh as great as that of the other shafts is a correct speed in ordinary filing, although of course this may be varied according to the requirements of the work to be done. Upon this cam-shaft are numerous cams which control various operations, as will be hereinafter more particularly described in connection with the description of the mechanisms which are specially affected thereby.

In Figs. 19 to 25, inclusive, is especially illustrated mechanism by which the saw is regularly fed forward. The cam-shaft 12 carries, among others, the cam-wheel 13, upon the side of which is a cam 14, as best shown in Fig. 19, and which is adapted as it revolves to force the plunger 15 in one direction, said plunger, as most clearly shown in Figs. 21 and 22, being impelled in the other direction by a spring 16 and by which also it is normally held toward the cam-wheel and its end into the path of the cam. A lever 17 is pivoted to the framework of the machine, and its upper end is connected to the feed-works carried by the housing 18, while its lower end normally is in the path of the reciprocating plunger 15. Obviously when the plunger 15 is operated by the cam 14 the effect is to force forward the feed devices through the medium of the lever 17, and thus, as will be presently described, feed the saw forward. It frequently happens, however, that it is not desirable to feed the saw continuously, and we have therefore provided a means whereby the plunger 15 can be thrown out of position, so as not to come in contact with the lever 17 when it is operated by the cam. This shifting of position is best illustrated in Fig. 20. The plunger 15 is incased in a box-like housing 19, which is held to the framework at one corner by a pivot 20. A lever 21 is pivoted alongside this housing 19 by a pivot 22 and has a cam-slot in its inner end which engages with a suitable pin 23, extending upwardly from a wing on the housing 19. By moving the lever 21 thereof the housing 19 can be thrown from the position indicated by the dotted lines in Fig. 20 to the position indicated by the full lines, when, as will be readily seen, its contact-point 24 is so shifted as not to come in contact with the lever 17. The pivot-bolt 22, upon which the lever 21 is mounted, is carried by a rigid portion of the frame of the machine and passes up through a slot in the wing, which projects from the housing 19, which slot is so formed and arranged, as shown in Fig. 21, as to at once permit and limit the movement occasioned by the lever, as will be readily understood. The contact-point 24 is itself adjustable, as best shown in Fig. 21, and which enables the plunger to be varied somewhat in length and the throw of the lever 17 correspondingly adjusted, so as to feed the saw forward to precisely the extent desired. The lever is returned to position, after being operated by the plunger 15, by the spring 25, as shown in Figs. 5, 6, and 19.

The upper end of the lever 17 is slotted and engages with the stud-bolt 26, which extends out from the plunger 27, which plunger is mounted in a suitable guide or way in the housing 18, as shown in Figs. 19, 23, 24, and 25. In order that this plunger shall work properly at all times with sufficient freedom and without lost motion, a liner 28 is provided in the bearing therefor, which liner is adapted to be adjusted by set-screws 29. A block 30 is secured upon or is formed in piece with this plunger 27, and upon this are pivotally mounted pawls 31, which are adapted to extend out between and engage with the teeth of the saw, and thus as the plunger 27 is forced forward by means of the lever 17 these pawls feed the saw forward. Said pawls are pivotally mounted and are normally held toward or into engagement with the saw by means of a spring 32, carried from the block 30 and engaging with projections on the hubs of said pawls, as best shown in Figs. 23 and 24. Stops 33 prevent too great a movement of the pawls in this direction. The pawls are provided with handles 34, by which they may be thrown out of engagement by hand when desired. One of the pawls 31 is carried upon an adjustable mounting 35, as best shown in Fig. 24, so that the distance between the two pawls can be adjusted somewhat to correspond to variations in the teeth of the saws being filed, and an adjusting and holding screw 36 is provided to effect and maintain such adjustment, all of which will be clearly understood by an inspection of Fig. 24. The rear sides of the engaging points of the pawls 31 are inclined, so that they free themselves from the teeth of the saw during the return movement to the position from whence they start in feeding the saw forward, as best shown in Fig. 23.

The guide-plate 37, carried between adjustable nuts 38 on screw-threaded standards 39, assists in entering the saw into the machine in proper position, as indicated in Figs. 19 and 25, and prevents the weights W, through the saw support or carrier 1, from raising the saw too far before it is fully under the control of the clamps and guiding-strip. This guide-plate, as shown, is short and does not extend to the point where the files operate upon the saw-teeth, and therefore is only in contact with said teeth before they are filed or sharpened.

We provide a stop which, except during the time while the saw is being fed forward by the pawls, drops behind one of the clearing-teeth of the saw and prevents any further forward movement. Upon the shaft 12 (see Fig. 31) is a cam-wheel 40, upon which is located an adjustable cam 41, which comes in contact with the adjustable contact-point 42 on the lower end of a vertical rod 43, which is capable as said cam-wheel revolves of being operated by the said cam 41 thereon. Upon the upper end or head of this rod 43 is secured an arm, which is preferably formed in two sections 44 and 45, as best shown in Fig. 32. The point of the arm-section 45 comes behind a projection 46 on the frame, which projection is substantially the shape of and bears against one of the clearing-teeth of the saw and which, we may here remark, assists in supporting the clearing-teeth while they are being filed, and is provided for the reason that such clearing-teeth during that time need a support nearer their extreme ends than the other teeth, because the file comes squarely across the saw in filing them instead of at an angle therewith, as the files do in filing the cutting-teeth. The operation is that at the conclusion of the filing of any particular tooth the cam 41 comes against the adjustable extension-piece 42, and through it lifts the rod 43 and its arm 44 45. At this instant the feeding apparatus, previously described, operates, forcing the saw forward. When the cutting-teeth have passed the point of the arm member 45, the cam has escaped from the contact-point 42 and the structure descends, bringing said arm member 45 down behind the clearing-tooth which is just about to be filed and the projection 46 on the frame, thus stopping the saw at exactly the right point and holding it there through the then immediately succeeding filing operation. As best shown in Fig. 32, the part 45 is adjustable upon the part 44, so that this machine may be adjusted in this particular, as in others, to receive saws having teeth of varying coarseness or distances apart. The contact-point 42 is adjustable not only vertically by means of the nuts 47 thereon, but is also adjustable horizontally by means of the slot in that portion of the bar 43 through which it passes. Said slot is most clearly illustrated in Fig. 34. In order that this stop may be raised at any time when desired, irrespective of the movement of the shaft 12, we provide a reciprocating rod 48, which is carried by a stud 49 on the framework, extending through a slot therein and the point of which has a cam inclination which passes underneath a pin 50 in the rod 43, or some suitable contact-point or projection within or upon said rod 43. As shown, we prefer to use the pin 50 and make a slot in the rod 43 for the point of the bar 48.

It is necessary that at the point where the files come in contact with the saw in the operation of filing the saw-blade shall be clamped and held with considerable rigidity and firmness. It is also necessary that this clamping should take place automatically just before the filing commences upon each set of teeth being filed and be released automatically as the filing is completed upon each set of teeth, so as to permit the feeding operation to take place at the proper time. As indicated in Fig. 8, one side of the vise or clamp in question is carried by and rigid with an upright member of the framework. The other jaw of the vise is carried by the pivoted arm 51, which, as best shown in Figs. 26 and 27, is carried on a pivot 52, which pivot is rigidly carried by a slide 53. Said slide is preferably of a dovetail formation and is mounted in a correspondingly-formed groove in the upright standard 54 on the frame. A liner 55 and a set-screw 56 form a means of adjusting this bearing to compensate for wear, &c. There is a slot in the standard 54, through which the pivot-bolt 52 passes, and it also passes through and engages with a lever 57, which is positioned on the opposite side of the standard 54 from the pivoted member 51. Two studs 58 rigidly project from the standard 54, one on either side of the slot therein, and the end of the lever 57 which passes between these studs is of an oval shape, so that as said lever is rocked back and forth its contact with these studs will force the slide 53 slightly in one direction or the other, and thus carry the vise-arm 51 toward or away from that portion of the framework which constitutes the other vise-arm. The movement is limited by suitable stops, preferably screws 59, or adjustable nuts thereon. By means of this lever 57, therefore, the vise can be opened and closed at will. This is, however, not the normal operation of the vise. Upon the shaft 12 is a cam-wheel 60, the form of which is best shown in Fig. 28. In the lower end of the vise-arm 51 is an antifriction-roller 61, with which the cam-wheel 60 is in contact. The parts are so adjusted that normally when the larger diameter of the cam-wheel 60 is in contact with this roller 61 the jaws of the vise will be forced strongly toward each other and the saw thus clamped, while when the cut-away or smaller portion of the cam-wheel 60 comes against said roller 61 the vise-arm 51 is permitted to swing on its pivot, so as to open the vise-jaws and release the saw. This happens at the time when the saw is to be fed forward, while the larger diameter operates during the filing of the saw-teeth. As saws vary in thickness somewhat it is necessary, in order to have the proper tension at all times, that the vise should be capable of yielding somewhat. The bearings 62, which carry the antifriction-roller 61, are therefore mounted in slots in the lower end of the arm 51, and pins extend back from said bearing and come in contact with the large flat spring 63, which latter is rigidly attached to the vise-arm 51. Obviously, therefore, in the case of a thicker saw this spring 63 will yield somewhat, and thus accommodate the increased thickness.

As is well understood by those familiar with crosscut-saws and as is shown in Figs. 7 and $7^b$, such saws have two varieties of teeth, known, respectively, as the "cutting-teeth" and the "clearing" or "raker" teeth. The cutting-teeth are filed at an angle, so as to produce sharp cutting-points, while the clearing-teeth are filed square across, so that the resulting operative edges are at right angles with the plane of the saw-blade. The cutting-teeth are filed so that the points are alternately upon one side or the other of the saw, as is also well understood. It is therefore necessary in a machine for filing crosscut-saws that there should be three files, one of which is positioned so as to operate at an angle of approximately forty-five degrees, with the saw-blade upon one side, another of which operates at a similar angle upon the other side, and the third of which operates at right angles with the saw-blade. Our present machine embodies these features, and the files are driven through appropriate pitmen from the shafts 9, 10, and 11, respectively. In Figs. 2 and 3 we illustrate the complete machine, including the three files. In Figs. 4 and 11 only the clearing-tooth file is shown. In Figs. 8 and 17 the two cutting-tooth files are shown. In Fig. 18 one of the cutting-tooth files is shown, and in Figs. 12 to 16, inclusive, we show the construction of the parts by which the peculiar manipulation of files which is required to do the work in question is particularly illustrated.

We will first describe particularly the mechanism by which the clearing-tooth file is operated and will afterward describe such differences as exist between this mechanism and that by which the cutting-tooth files are operated and also briefly mention the principal corresponding parts.

Referring now particularly to Fig. 11, it will be noticed that a shaft 64 is mounted in a slot in a standard of the framework, which standard extends upwardly at such an angle that the slot therein is at substantially right angles with the path of the file-carriage and file.

Upon this shaft is a file-carriage frame 65, and the method of mounting and adjustment is illustrated especially in Fig. 15. Within this file-carriage frame is a file-carriage 66, substantially in the form of a cross-head, which is driven by a pitman 67 from a crank-wheel 68 on the shaft 11, as shown in Figs. 3 and 4, where also a means of adjusting the wrist-pin on said crank-wheel is shown, so as to vary the length of the stroke of the file. As will be noticed also, the pitman is composed in part of a right and left hand threaded rod which enters the other parts and by which the length of the pitman itself can also be adjusted as desired. These adjustable features of a pitman in a filing-machine are, however, illustrated in our previous patent, No. 561,147, dated June 2, 1896, and need not be further described here, being equally applicable to our present machine as to the machine described in said patent.

As best shown in Figs. 14 and 14ª, what may be termed the "file-holder" 69 is mounted in a suitable bearing 70, which is in turn mounted in the file-carriage 66. This bearing or socket 70 is rendered adjustable by being mounted on a pivot 71, and the adjustment is effected by means of set-screws 72 72, as best shown in Fig. 14ª. By this means the file-point may be elevated or depressed relatively to the path of travel, as may be required by the exigencies of the work being done. The shank of the file-holder 69 extends back through the bearing 70, which, as shown, is of considerable length, and upon its rear end is an upright arm 73. This is secured in place by a bolt 74, and a spline or pin 75 holds it from rotating thereon. The arm 73 is preferably composed of two parts, as shown, and these may be capable of slight adjustment in relation to each other, although this ordinarily is not required. The means of adjustment is clearly shown in Figs. 16 and 16ª and is effected by the set-screws s. Extending out from the upper portion of the file-carriage frame 65 is a plate 76, and this plate has two slots therein and an opening in the forward end in which both slots terminate, leaving a tongue-shaped piece between them. The arm 73 extends up through the said slots and opening in the plate 76 and is adapted to be shifted from one side to the other and to occupy the slots in said plate alternately, passing back and forth therein as the file-carriage is reciprocated. As this arm is shifted it rocks the file, and thus causes said file to operate first upon one side and then upon the other of the tooth being filed. On the forward end of the tongue between the slots is a V-shaped shifter 77, which is carried by the central pivot 78, as shown in Fig. 12, and is adapted to rock from side to side on said pivot. At the rear end of this shifter we provide a suitable stop whereby its movement is limited, and such stop may be either the projection 79 or the pin 80, or both. Our experience has led us to give a slight preference to the projection 79, and this we prefer to build up of leather or rawhide, with metal plates or washers upon the outside, and secure it to the tongue of the plate 76 by a suitable bolt. As best shown in Fig. 14, we mount a spring 81 upon the plate 76 and connect it by means of a stud 82 and a rod 83 with the shifter 77. The forward side of the shifter is beyond the end of the tongue-like center of the plate 76. In operation as the file-carriage moves forward the arm 73 comes against the rearmost tapering side of the shifter 77 and swings said shifter somewhat on its pivot, so that said arm is permitted to pass, it being returned to position immediately after said arm has passed by the force of the spring 81. As the file carriage moves backwardly the arm 73 comes in contact with the other tapering side of the shifter 77 and is thereby carried to the slot on the opposite side of the plate 76. As it continues backwardly it comes in contact with the corresponding ear on the shifter 77 and turns it to its other position ready to operate to shift the file back to its former position upon the next stroke of the file-carriage, as will be readily understood. Said shifter thus automatically shifts the position of the file at every stroke of the file-carriage, so that the file operates alternately first upon one side and then upon the other side of the tooth being filed. It is necessary that the relative position of this file to the others be adjusted with great nicety. To this end we have provided upon the shaft 64 a sleeve 84, (see Fig. 15,) upon which the file-carriage frame 65 immediately rests. Both ends of this sleeve are screw-threaded, and upon these screw-threaded ends we place nuts 85, whereby, as will be readily understood, the file-carriage frame can be adjusted longitudinally of the shaft 64. We prefer to provide these nuts with handles 86, as indicated by dotted lines in Fig. 15, although of course the principle would be the same if the handles were omitted and a wrench employed. When the handles are employed, in order to keep them always in that position where they are convenient to be used we prefer that they shall be annular, as shown, and they may when so arranged be secured to the nuts 85 by set-screws 87. Rotary movement between the file-carriage frame 65 and the sleeve 84 is prevented by means of a screw 88, which is carried by said frame and enters a suitable groove in said sleeve, as shown in Fig. 15.

The outer end of the shaft 64 is supported and strengthened by a two-part standard 89, the parts of which are secured together by means of machine-screws 90, passing through a slot in one and into suitable screw-threaded holes in the other, as best shown in Fig. 15. The position of the file-carriage frame 65 and the parts carried thereby may be varied vertically by raising and lowering the shaft 64. As plainly shown, one end of said shaft is secured within a slot in a standard of the framework by the nut 91, while the other is carried, as just described, by the two-part standard 89. The adjustment is effected by loosening the machine-screws 90 and the nut 91, adjusting the vertical position of the shaft, and then retightening said machine-screws and nut, as will be readily understood.

As is well known, it is necessary in conducting a filing operation that the files should be free from contact with the article being filed during the rearward stroke. The file-carriage frame 65 is capable of rocking on the shaft 64, which rocking obviously results in raising or depressing the file and freeing it from or throwing it into contact with its work. In order that this rocking shall be done automatically and at the proper time, we have provided a bar 92, rigidly connected to the file-carriage frame 65 and by which said file-carriage frame is to be locked, and the ends of which are to be operated at suitable intervals by appropriate cams. One of these cams 93 is secured to the wheel 68 on the shaft 11 and of course operates at every revolution of said wheel and every stroke of the file. As best shown in Fig. 11, we prefer to make the contact-surface with which this cam 93 comes in contact in the form of an antifriction-roller 94 and to mount said roller in an adjustable bearing, said bearing being shown as secured to the bar 92 by bolts 95 passing through a slot in said bar. By this means the file 96 is raised during each and every rearward stroke thereof, as will be readily understood. The other end of the bar 92 extends down near the shaft 12, where it bears a contact-point 97, and upon said shaft is a cam-wheel 98, bearing a suitable cam 99, which is adapted as said shaft and wheel revolve to come in contact with said contact-point, and thus lift said bar 92 and rock the file-carriage frame. This, like most of the other cams on said cam-shaft 12, operates at the time when it is desired to feed the saw forward, and the duration of the contact of the cam 99 with the contact-point 97 is substantially equal to the time occupied in the feeding of the saw, and thus during said time the file is held out of contact with said saw irrespective of the direction of its movement. We also provide a means whereby this file can be thrown up out of contact with its work at any time by the operator without stopping the machine. Upon the bar 92 is a projection 100, below which the wedge-shaped end of a cam-bar 101 is adapted to pass. Obviously when the broader part of said bar 101 is forced beneath said projection 100 said bar 92 is caused to rock the file-carriage so long as said parts remain in that position. The bar 101 is carried by suitable supports 102 on the frame portion alongside of which it passes, as best shown in Fig. 10.

The movement of the bar 92 is limited in one direction by the stop-screw 103, which is suitably mounted in the frame of the machine, as best shown in Fig. 11. This screw being adjustable, the position of said bar can of course be easily regulated. The bar 92 is normally held toward this stop-screw 103 by a spring 104, which spring is carried by a rock-shaft 105, which shaft is suitably mounted in the framework. This shaft 105 is held to its proper position by set-screws 106, as shown in Figs. 3 and 4.

The weight of the file, file-carriage, and file-carriage frame is approximately counterbalanced by the counterbalancing-weights 107, carried upon the end of the bar 92.

We have now illustrated and described in detail the file-carriage frame for the upper or horizontally-moving or clearing-tooth file and the mechanism by which the same is operated, adjusted, and controlled. With a few exceptions, which will presently be pointed out, said description applies also to the filing mechanisms which move at an angle with the saw and by which the filing of the cutting-teeth is accomplished. This will be apparent upon an inspection of the drawings, especially Figs. 17 and 18. Adopting said description, therefore, so far as applicable, we will proceed to describe the parts which differ.

The shafts 108 correspond to the shaft 64, and they are adjustable in slotted bearings in the framework in a similar manner. The springs 109, which extend out from the file-carriage frames near these shafts, are very similar to the spring 104, but the tension thereof is regulated in a different manner. Mounted on the framework at a suitable point adjacent to said springs are rock-shafts 110, which bear cams 111, which are adapted to come in contact with said springs and also have handles or levers 112. At or near one end of the machine, at a point convenient to the operator, is a detent or ratchet bar 113, with which suitable engaging projections on the levers 112 are adapted to engage. As will be readily understood, by moving said levers to such suitable point as may be desired the tension on the springs, and consequently upon the files 114, is regulated. The adjustment of the tension of these springs and the consequent variation of pressure upon the files are important for the reason that sharp or new files require much less pressure than do files after they have been worn, and by the means described said pressure can be accurately adjusted.

The bars 115 correspond to the bar 92, and they are respectively operated by cams on the shafts 9 and 10 at every stroke and by a cam 126, carried by the cam-wheel 127, on the shaft 12 at the time of feeding, correspondingly to the similar operations already described. Said bars 115 are, however, thrown out of engagement by the operator in a somewhat different manner from that in which the bar 92 is operated and that is best shown in Figs. 17, 18, and 18ª. Sliding bars 116 are carried in bearings 117 on the frame of the machine and hook around the bars 115 at one end and are provided with studs or projections 118 at the other end. Reciprocating bars 119, having wedge-shaped cam ends, are adapted to come in contact with the projections 118, and thus operate the bars 116, and each of these cam-bars 119 has a lever 120, by which it may be operated, as best shown in Fig. 18, where one of the levers is shown in its operative position by means of dotted lines.

The crank-wheels 121 and 122 correspond to the crank-wheel 68, and the cams 123 and 124 correspond to the cam 93, and these cause the ordinary raising and lowering of the files, as already explained. At the other end of the bars 115 they are provided with projections 125, which are operated by the cam 126 on the cam-wheel 127, mounted on the shaft 12. The pitmen 128 and 129 correspond to the pitman 67, and the file-carriage frames 130 and 131 correspond to the file-carriage frame 65, being only slightly different in construction.

Hand-levers are provided to operate various of the parts heretofore described. Referring especially to Fig. 1, the hand-lever 132 operates through the connecting-rod 133 to move the lever 57. The hand-lever 134 operates to move the reciprocating rod 48 with its wedge or cam shaped end. The hand-lever 135 operates in a similar way to move the reciprocating rod 101.

The machine as a whole is driven by a belt 136 running from some suitable source of power (not shown) to a pulley 137 on a sleeve-shaft 138, which latter carries a clutch 139, which is adapted to be operated from a hand-lever 140 through a connecting-rod 141 and a shifting lever 142, the operation of which is to cause the sleeve-shaft 138 and the main shaft 8 to move in unison. A pinion on the main shaft 8 meshes with a spur-gear 143 on the shaft 12, which is thus driven thereby. The shafts 9 and 10 are driven from the shaft 8 by means of suitable sprocket-wheels thereon and the chain belts 144 and 145, and the shaft 11 is driven from the shaft 10 by suitable sprocket-wheels and a sprocket-belt 146, as best shown in Figs. 2 and 4.

The file 114 is secured to the file-holder by means of the clamping-bolts 147 and 148, the latter of which, as shown in Fig. 37, passes through a slot in the file-holder, and thus is adapted to be adjusted longitudinally to suit the length of the file. Placed beneath the file, between it and the file-holder proper, is a flat bar 149. This is employed during the early period of using a file while it is sharpest, and the result is on account of the peculiar angle at which the filing mechanism is set that it wears the file most rapidly near its edges. When the file becomes considerably worn, this strip is removed, and the bolts 147 and 148 tightened up, throwing the file back nearer the axial line of the file-holder, upon which it rocks. The effect of this is to move the file as it is rocked to different positions, so that the wearing-surface is brought nearer its center, and thus additional wear is secured from the same file.

Having thus fully described our said invention, what we claim as new, and desire to secure by Letters Patent, is—

1. The combination, in a saw-filing machine, with means for supporting the saw, of a suitable strip adapted to be placed over the toothed edge of the saw, and an adjacent member or members overhanging said strip and against which said strip bears in operation, whereby the saw is guided from its toothed edge by means of said strip.

2. The combination, in a saw-filing machine, of suitable overhanging shoulders or abutments, a saw-support positioned below the same, a strip mounted on the breast or toothed edge of the saw carried by said support and bearing against said abutments, and yielding means for carrying said saw-support and saw whereby said strip is held into contact with said overhanging shoulders or abutments.

3. The combination, in a saw-filing machine, with the filing mechanism, of a yielding saw-support, overhanging shoulders above said support, and a suitable strip adapted to be placed over the toothed edge of the saw and rest against said overhanging shoulders, the saw being thus guided in its passage through the machine by its breast or toothed edge.

4. The combination, in a saw-filing machine, of saw-clamps having overhanging shoulders near their upper edges, a yielding saw-support positioned between and guided by said saw-clamps at a point below the upper edges thereof, means connected to and supporting said yielding saw-support, and a slitted strip the slits whereof are adapted to pass over the teeth of the saw, and the edges whereof are adapted to engage with the overhanging shoulders of the saw-clamps, substantially as and for the purpose set forth.

5. The combination, in a saw-filing machine, of the saw-clamps, a yielding support for the saw positioned between said clamps, supporting-rods extending up from said support and pivoted thereto, and a bar 6 pivoted to said rods 4 and provided with handle-like ends, whereby either end of said saw-support may be moved independently of the other, whenever desired.

6. The combination, in a saw-filing machine, of a main shaft, 8, three filing-mechanism shafts, 9 10 and 11, driven at uniform speeds from said main shaft, the said several filing mechanisms, a shaft 12 carrying cams and driven at a slower speed than the filing-mechanism shafts, and arms extending from the filing mechanisms into the paths of said cams, whereby said filing mechanisms are automatically raised out of operative position at predetermined intervals, all substantially as set forth.

7. The combination, in the feeding mechanism of a saw-filing machine, of suitable pivoted pawls adapted to engage with the saw-teeth, a reciprocating base for said pawls, a pivoted lever engaging with said reciprocating base, a plunger adapted to operate said lever, and a cam, carried by the cam-shaft of the machine, for operating said plunger, whereby at each complete revolution of said cam-shaft the saw is fed forward.

8. The combination, in a saw-filing machine, with the main feeding-lever, of a plunger for operating said lever, a cam for operating said plunger, and a pivoted housing containing said plunger, which is adapted to be swung into or out of the path of said lever, whereby said lever may be either regularly intermittingly operated by said plunger or permitted to remain at rest, as may be required.

9. The combination, in the feeding mechanism of a saw-filing machine, with the feed-lever and its engaging means, of an actuating-plunger 15 for said feeding-lever, a housing 19 therefor, a pivot 20 for said housing, a lever 21 mounted on a pivot 22 alongside said housing and provided with a suitable cam-slot, and a pin 23 extending from a wing on said housing up through said cam-slot, substantially as shown and described.

10. The combination, in the feeding mechanism of a saw-filing machine, with the main feeding-lever, of a plunger 15 for operating said lever mounted in a suitable housing, a spring 16 whereby said plunger is normally held to the limit of its movement in one direction, a cam 14 by which, when the saw is to be fed forward, said plunger is moved in the other direction, and means whereby said plunger may be thrown into and out of its operative position, substantially as set forth.

11. The combination, in the feeding mechanism of a saw-filing machine, with the main feeding-lever, of a reciprocating plunger for operating said lever mounted in suitable ways and moving in a rectilineal path, said plunger being provided with an adjustable contact-point 24 whereby its length and stroke may be accurately adjusted, a suitable cam for operating said plunger in one direction, and a suitable spring whereby it is normally held to the limit of its movement in the other direction, substantially as set forth.

12. The combination, in the feeding mechanism of a saw-filing machine, with the main feeding-lever, of a plunger 27 mounted in suitable ways and moving in a rectilineal path therein and located at the upper end of said lever, pivoted pawls 31 carried by said plunger and adapted to engage with the teeth of the saw, and a spring 32 whereby said pawls are normally held into contact with said teeth, the rear sides of the pawl-points being inclined and the backward movement of the feeding mechanism thus permitted, substantially as shown and described.

13. The combination, in the feeding mechanism of a saw-filing machine, of the reciprocating plunger carrying the feeding-pawls, an adjustable mounting 35 for one of said pawls, and an adjusting-screw 36, whereby the position of said mounting may be adjusted and the distance between the pawls thus accurately determined.

14. The combination, in a saw-filing machine, with the saw and the feeding mechanism, of a stop for said saw, and means for automatically raising said stop as the saw is fed forward and for dropping said stop behind one of the teeth of the saw just prior to the cessation of the forward movement thereof, whereby said saw is always stopped accurately to exact position, substantially as set forth.

15. The combination, in a saw-filing machine, of a saw-feeding mechanism, a saw-stop, a cam-shaft, and two cams carried by said shaft one of which operates the feeding mechanism and the other of which raises the stop, said cams being relatively so positioned that said stop is raised just prior to the forward movement of said feeding mechanism and dropped just prior to the cessation of said forward movement, substantially as set forth.

16. The combination, in a saw-filing machine, of a stop for the saw consisting of a vertical rod 43 having an arm at its upper end adapted to extend out and engage with saw-teeth as they are successively fed forward, a contact-point at its lower end, and a revolving shaft having a cam which comes in contact with said contact-point, whereby said vertical rod is intermittingly raised and permitted to descend.

17. The combination, in a saw-filing machine, of a vertically-moving rod, a stop-arm carried by the upper end of said rod, an adjustable contact-point carried by the lower end of said rod, and a revolving cam adapted to operate said rod through said contact-point, substantially as set forth.

18. The combination, in a saw-filing machine, of a vertically-moving rod, means for operating said rod intermittingly, and an adjustable arm consisting of two sections 44 and 45 carried by the upper end of said rod and adapted to come behind and engage with certain of the saw-teeth as the saw is fed forward and thus stop the saw accurately to position, and to be adjusted for use with saws having various sizes of teeth, substantially as shown and described.

19. The combination, in a saw-filing machine, of a stop mechanism for the saw, means for intermittingly operating the same, and means, consisting of a reciprocating cam-rod 48, a support 49, and a contact-point 50, whereby said stop device may be held out of operation, substantially as set forth.

20. The combination, in a saw-filing machine, with the feed mechanism for the saw, of a stop device, means for regularly intermittingly operating said stop device, and means for holding said stop device out of operation, substantially as set forth.

21. The combination, in a saw-filing machine, of the pivoted clamping-arm 51 having an antifriction-roller 61 mounted in its lower or non-clamping end, sliding bearings in said end carrying said roller, rods extending out from said bearings, and a spring 63 bearing against said rods and thus holding said bearings and the roller carried thereby forward, substantially as and for the purposes set forth.

22. The combination, in a saw-filing machine, of a stationary clamping-jaw, a pivoted arm carrying the other clamping-jaw, a pivot 52 carrying said pivoted arm, a slide 53 carrying said pivot, and a lever for operating said slide, whereby said clamping-jaw can be thrown into and out of operative position.

23. The combination, in a saw-filing machine, with the clamping-jaws of a standard or frame part 54 having a slot and a way therein, a slide 53 mounted in said way, a pivot 52 mounted in said slide and passing through said slot, pins or projections 58 on the upper end of said standard alongside said slot, and a lever 57 having an oval end mounted on said pivot and bearing against said pins, whereby said slide may be given a slight reciprocating motion.

24. The combination, in a saw-filing machine, with the clamping-jaws of the rigid standard or frame part 54, the slide 53 mounted therein, adjustable stops 59 59 for limiting the movement of said slide, and a lever 57 for moving the same within the limit of its adjustment, substantially as set forth.

25. The combination, in a saw-filing machine, of the file-carriage, a file-holder bearing therein, a pivot on which said file-holder bearing is mounted, and set-screws one on either side of said bearing, whereby the relation of said bearing to said file-carriage may be adjusted and the point of the file thus elevated or depressed, substantially as set forth.

26. The combination, in a saw-filing machine, with a reciprocating file-actuating device and means for propelling said device and for raising it as a whole on its return stroke and thus freeing the file from contact with the saw-tooth on such return stroke, of a shifter for rocking said file-actuating device on its axis, whereby as the file is reciprocated, it is automatically turned from side to side and applied alternatively to both sides of the saw-teeth being filed.

27. The combination, in a saw-filing machine, of a reciprocating file-carrying device, means for propelling the same, means for raising the same on its return stroke, a pivoted V-shaped shifter, and a connection between said file-carrying device and said shifter whereby the latter is enabled to shift the former from side to side and cause the file to operate alternatively upon both sides of the saw-tooth being filed.

28. The combination, in a saw-filing machine, of a reciprocating file-actuating device, a plate situated alongside said device containing two parallel slots united at one end, a V-shaped shifter pivoted to said plate between said slots, and an arm extending from the file-holder through said slots alongside the shifter and adapted to be actuated thereby, whereby the file is rocked from side to side.

29. The combination, in a saw-filing machine, of a rocking file-carriage frame, a reciprocating file-carriage mounted therein, a plate mounted on said frame and situated alongside said file-carriage and containing two slots, an arm extending out from the file-holder, and means for shifting said arm from one slot to the other in said plate as the file-carriage travels back and forth.

30. The combination, in a saw-filing machine, with the reciprocating file-holder provided with an arm or extension, of a pivoted V-shaped shifter having wings with which said arm on the file-holder is adapted to come in contact, whereby said shifter is actuated in one direction, a stop limiting the movement of said shifter, and a spring whereby said shifter is held against its stop when not forced therefrom by said extension on the file-holder.

31. The combination, in a saw-filing machine, of the file-carriage containing a file-holder bearing, a file-holder mounted in said bearing, an arm on said file-holder, a plate on the file-carriage frame above the file-holder having slots therein with a tongue between them, a pivoted V-shaped shifter on said tongue, a spring carried by said plate, a connection between said pivoted shifter and said spring, and a stop by which the movement of said shifter is limited, whereby said file-holder and with it the file are rocked from side to side as the file-carriage reciprocates.

32. The combination, in a saw-filing machine, of a rocking file-carriage frame, a reciprocating file-carriage mounted therein, a file-holder mounted in said file-carriage and adapted to be rocked from side to side, whereby the file is adapted to be applied first to one side and then to another of a saw-tooth, an arm on said file-holder, and a shifter mounted upon the frame above the file-carriage with which said arm is adapted to come into contact and whereby said rocking is effected.

33. The combination, in a saw-filing machine, of a file-carriage, a file-holder carried thereby and adapted to rock from side to side, an arm projecting from said file-holder, and means adapted to tip said arm and rock said file consisting of a plate 76 having two slots between which is a central tongue, a V-shaped shifter 77 pivoted to said tongue, a stop whereby the movement of said shifter is limited, a spring 81, and a rod 83 connecting said shifter and said spring, said several parts being arranged and operating substantially as set forth.

34. The combination, in a saw-filing machine, of a reciprocating file-actuating device, a file-holder mounted and adapted to rock therein, an arm on said file-holder, a plate positioned alongside the path of travel of the file containing parallel slots united at one end, a pivoted shifter carried by the portion of said plate between said slots having ears thereon which are adapted to extend over said slots upon one side or the other as the same is shifted, a stop whereby the movement of said shifter is limited, and a spring whereby said shifter is normally held against one side or the other of said stop, as its position is shifted, the arm on the file-holder being adapted to operate the shifter and the shifter in turn adapted to shift the position of the arm.

35. The combination, in a saw-filing machine, of the rocking file-carriage frame, the reciprocating file-carriage mounted therein, a file-holder mounted in said file-carriage, a shifter located above said file-carriage, and an arm mounted on said file-holder and adapted to be operated by said shifter, said arm being composed of two parts adjustably secured together, substantially as shown and described.

36. The combination, in a saw-filing machine, of a file-carriage frame supported and adapted to rock on a suitable bearing and supporting and guiding the file-carriage and file, an arm 92 rigidly secured to said file-carriage frame, one end whereof is adapted to be operated by a cam on the shaft which drives the file-carriage and the other end of which projects into the path of and is adapted to be operated by a cam on the cam-shaft, and said driving-shaft, and said cam-shaft, whereby, by means of the same arm, the file-carriage frame is rocked to raise the file out of contact upon every rearward stroke of the file, and also rocked to maintain it out of contact during the time the saw is being fed forward, substantially as shown and described.

37. The combination, in a saw-filing machine, of a rocking file-carriage frame, an arm whereby said frame is rocked, a spring 104 whereby the file is normally held in contact with the saw, a cam-wheel operating oppositely to said spring whereby the file is thrown out of contact, and an adjusting-screw 103 whereby undue contact is prevented, substantially as shown and described.

38. The combination, in a saw-filing machine, of the file-carriage frame, an arm 92 secured to said frame, cams adapted to operate said arm and rock said frame, a projection 100 on said arm, and a reciprocating cam rod or bar 101 adapted to be forced under said projection and thus rock the frame and hold the file out of contact whenever desired, substantially as set forth.

39. The combination, in a saw-filing machine, with a rocking file-carriage frame, of a rock-shaft 110 having a cam 111, and a spring 109 on the rocking file-carriage frame with which said cam comes in contact, a lever 112 on said shaft 110, and a rack-bar having numerous notches with which a suitable engaging point on said lever may engage, whereby the tension of said spring may be conveniently increased or diminished and the force of the file on its work thus regulated, substantially as shown and described.

40. The combination, in a saw-filing machine, of a rocking file-carriage frame, a bar 115 whereby the rocking of said frame is controlled, a sliding bar 116, a bearing 117 therefor, a reciprocating cam-bar 119 adapted to engage with the bar 116, and a lever 120 for operating said cam-bar, substantially as and for the purposes set forth.

41. The combination, in a filing-machine, of a rocking or rotatable file-holder, suitable clamping devices at the heel and point of said holder for holding the file, and a removable strip adapted to be placed between the file and the file-holder and to be removed therefrom, whereby additional wear is secured from the file, substantially as set forth.

42. The combination, in a filing-machine, of a filing mechanism for filing the cutting-teeth of the saw, means for rocking said filing mechanism from side to side, and a plate adapted to be inserted or removed from beneath the file, whereby the file is enabled to be shifted farther from or nearer to the axis of the file-holder on which it rocks, and the points of wear of the file thus varied, substantially as set forth.

In witness whereof we have hereunto set our hands and seals, at Indianapolis, Indiana, this 3d day of February, A. D. 1898.

THOMAS L. WALLACE. [L. S.]
JAMES A. REED. [L. S.]

Witnesses:
CHESTER BRADFORD,
JAMES A. WALSH.